United States Patent
Olson et al.

(10) Patent No.: US 11,634,524 B2
(45) Date of Patent: Apr. 25, 2023

(54) ACID-CATALYZED CURABLE COATING COMPOSITIONS CONTAINING 1,1 DI-ACTIVATED VINYL COMPOUNDS AND RELATED COATINGS AND PROCESSES

(71) Applicant: PPG Industries Ohio, Inc., Cleveland, OH (US)

(72) Inventors: Kurt G. Olson, Gibsonia, PA (US); Aditya Gottumukkala, Monroeville, PA (US); Craig D. Niederst, Valencia, PA (US); David R. Fenn, Allison Park, PA (US); Carol L. Boggs, Cheswick, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 17/468,046

(22) Filed: Sep. 7, 2021

(65) Prior Publication Data

US 2022/0056180 A1 Feb. 24, 2022

Related U.S. Application Data

(62) Division of application No. 16/320,671, filed as application No. PCT/US2017/044005 on Jul. 26, 2017, now Pat. No. 11,136,469.

(60) Provisional application No. 62/366,781, filed on Jul. 26, 2016, provisional application No. 62/403,707, filed on Oct. 4, 2016.

(51) Int. Cl.
| | |
|---|---|
| *C08F 222/14* | (2006.01) |
| *B05D 7/00* | (2006.01) |
| *C08K 5/00* | (2006.01) |
| *C09D 7/63* | (2018.01) |
| *C09D 5/00* | (2006.01) |
| *C09D 163/00* | (2006.01) |
| *C08L 79/00* | (2006.01) |
| *C09D 4/06* | (2006.01) |
| *C08L 77/00* | (2006.01) |
| *C08L 63/00* | (2006.01) |
| *C08L 75/00* | (2006.01) |
| *C09D 7/65* | (2018.01) |
| *C09D 133/14* | (2006.01) |
| *C09D 161/28* | (2006.01) |
| *C08L 61/28* | (2006.01) |
| *B05D 3/02* | (2006.01) |

(52) U.S. Cl.
CPC ............ *C08F 222/14* (2013.01); *B05D 7/572* (2013.01); *B05D 7/574* (2013.01); *C08K 5/0025* (2013.01); *C08L 63/00* (2013.01); *C08L 75/00* (2013.01); *C08L 77/00* (2013.01); *C08L 79/00* (2013.01); *C09D 4/06* (2013.01); *C09D 5/00* (2013.01); *C09D 7/63* (2018.01); *C09D 7/65* (2018.01); *C09D 133/14* (2013.01); *C09D 161/28* (2013.01); *C09D 163/00* (2013.01); *B05D 3/0254* (2013.01); *B05D 7/534* (2013.01); *B05D 7/542* (2013.01); *B05D 2202/10* (2013.01); *B05D 2401/20* (2013.01); *B05D 2508/00* (2013.01); *B05D 2518/00* (2013.01); *C08L 61/28* (2013.01); *C08L 2207/53* (2013.01)

(58) Field of Classification Search
CPC .............. C08F 222/14; C08F 220/1804; C08F 222/102; C08F 220/56; C08F 220/14; B05D 7/572; B05D 7/574; B05D 3/0254; B05D 7/534; B05D 7/542; B05D 2202/10; B05D 2401/20; B05D 2508/00; B05D 2518/00; B05D 7/53; B05D 7/57; B05D 1/36; C08K 5/0025; C08K 5/11; C08L 63/00; C08L 75/00; C08L 77/00; C08L 79/00; C08L 61/28; C08L 2207/53; C08L 33/08; C08L 75/12; C08L 75/16; C09D 4/06; C09D 5/00; C09D 7/63; C09D 7/65; C09D 133/14; C09D 161/28; C09D 163/00; C09D 133/08; C08G 18/0823; C08G 18/1825; C08G 18/3221; C08G 18/348; C08G 18/4854; C08G 18/6674; C08G 18/6692; C08G 18/672; C08G 18/755; C08G 71/04; C08G 18/48; C08G 18/66

See application file for complete search history.

(56) References Cited

U.S. PATENT DOCUMENTS

| | | | |
|---|---|---|---|
| 3,197,318 | A | 7/1965 | Halpern et al. |
| 3,660,263 | A | 5/1972 | Auletta et al. |
| 4,382,109 | A | 5/1983 | Olson et al. |
| 4,452,861 | A | 6/1984 | Okamoto et al. |

(Continued)

FOREIGN PATENT DOCUMENTS

| | | |
|---|---|---|
| CA | 2914897 A1 | 12/2014 |
| CN | 1318864 A | 10/2001 |

(Continued)

OTHER PUBLICATIONS

International Search Report and Written Opinion for International Patent Application No. PCT/US2017/044010, dated Oct. 2017.

(Continued)

*Primary Examiner* — Angela C Scott
(74) *Attorney, Agent, or Firm* — K&L Gates LLP

(57) ABSTRACT

Acid-catalyzed curable coating compositions containing 1,1-di-activated vinyl compounds are described, including multi-layer coatings. Also provided are processes for coating substrates with coating compositions comprising 1,1-di-activated vinyl compounds. Also provided are coated articles comprising coatings formed from coating compositions comprising 1,1-di-activated vinyl compounds.

19 Claims, No Drawings

(56) References Cited

U.S. PATENT DOCUMENTS

| | | |
|---|---|---|
| 4,740,534 A | 4/1988 | Matsuda et al. |
| 4,885,191 A | 12/1989 | Podszun et al. |
| 5,321,112 A | 6/1994 | Olson |
| 5,639,828 A | 6/1997 | Briggs et al. |
| 5,723,275 A | 3/1998 | Wang et al. |
| 6,517,940 B1 | 2/2003 | Millero et al. |
| 8,609,885 B2 | 12/2013 | Malofsky et al. |
| 8,884,051 B2 | 11/2014 | Malofsky et al. |
| 9,108,914 B1 | 8/2015 | Malofsky et al. |
| 9,181,365 B2 | 11/2015 | Malofsky et al. |
| 9,221,739 B2 | 12/2015 | Malofsky et al. |
| 9,234,107 B2 | 1/2016 | Malofsky et al. |
| 9,334,430 B1 | 5/2016 | Stevenson et al. |
| 9,416,091 B1 | 8/2016 | Sullivan et al. |
| 9,567,475 B1 | 2/2017 | Palsule et al. |
| 2003/0030170 A1 | 2/2003 | Abe et al. |
| 2003/0042142 A1 | 3/2003 | Yamoto et al. |
| 2005/0171273 A1 | 8/2005 | Ledwidge et al. |
| 2010/0213096 A1 | 8/2010 | Morales |
| 2014/0275419 A1 | 9/2014 | Ward et al. |
| 2014/0288230 A1 | 9/2014 | Malofsky et al. |
| 2014/0329980 A1 | 11/2014 | Malofsky et al. |
| 2015/0056879 A1 | 2/2015 | Malofsky et al. |
| 2015/0361283 A1 | 12/2015 | Malofsky et al. |
| 2016/0068618 A1 | 3/2016 | Sullivan et al. |
| 2018/0094115 A1 | 4/2018 | Martz et al. |
| 2019/0153244 A1 | 5/2019 | Puodziukynaite et al. |
| 2019/0160739 A1 | 5/2019 | Olson et al. |
| 2019/0161620 A1 | 5/2019 | Zalich et al. |
| 2019/0161640 A1 | 5/2019 | Gottumukkala et al. |

FOREIGN PATENT DOCUMENTS

| | | |
|---|---|---|
| CN | 100999625 A | 7/2007 |
| CN | 101314698 A | 12/2008 |
| CN | 102796909 A | 11/2012 |
| CN | 103520771 A | 1/2014 |
| CN | 104312246 A | 1/2015 |
| CN | 105143375 A | 12/2015 |
| CN | 105536049 A | 5/2016 |
| CN | 105585879 A | 5/2016 |
| EP | 0046088 A1 | 2/1982 |
| EP | 0327129 A1 | 8/1989 |
| EP | 0829756 A2 | 3/1998 |
| EP | 3042939 A1 | 7/2016 |
| JP | 2008019350 A | 1/2008 |
| KR | 20140145084 A | 12/2014 |
| WO | 2000032709 A1 | 6/2000 |
| WO | 2008086033 A1 | 7/2008 |
| WO | 2013036347 A1 | 3/2013 |
| WO | 2013059473 A2 | 4/2013 |
| WO | 2013149173 A1 | 10/2013 |
| WO | 2017210415 A1 | 12/2017 |
| WO | 2018022804 A1 | 2/2018 |
| WO | 2018022810 A1 | 2/2018 |

OTHER PUBLICATIONS

International Search Report and Written Opinion for International Patent Application No. PCT/US2017/043995, dated Nov. 7, 2017.
International Search Report and Written Opinion for International Patent Application No. PCT/US2017/044041, dated Nov. 7, 2017.
International Search Report and Written Opinion for International Patent Application No. PCT/US2017/044011, dated Oct. 30, 2017.
International Search Report and Written Opinion for International Patent Application No. PCT/US2017/044032, dated Nov. 6, 2017.
International Search Report and Written Opinion for International Patent Application No. PCT/US2017/044014, dated Oct. 27, 2017.
International Search Report and Written Opinion for International Patent Application No. PCT/US2017/044005, dated Nov. 3, 2017.
Triallyl Isocyanurate TAIC Product Description, Mitsubishi International PolymerTrade Corporation, http://www.michem.com/triallyl_isocyanurate.html, 6 pages, Apr. 4, 2019.

ACID-CATALYZED CURABLE COATING COMPOSITIONS CONTAINING 1,1 DI-ACTIVATED VINYL COMPOUNDS AND RELATED COATINGS AND PROCESSES

CROSS-REFERENCE TO RELATED APPLICATIONS

This application is a divisional application of U.S. patent application Ser. No. 16/320,671, filed Jan. 25, 2019, which is a U.S. national stage application of International Patent Application No. PCT/US2017/044005, filed Jul. 26, 2017, which claims priority to U.S. Provisional Patent Application No. 62/366,781, filed on Jul. 26, 2016, and U.S. Provisional Patent Application No. 62/403,707, filed on Oct. 4, 2016, the contents of each are hereby incorporated by reference.

BACKGROUND OF THE INVENTION

Coating compositions are used to form coating layers that are applied to a wide variety of substrates to provide color and/or other visual effects, corrosion resistance, abrasion resistance, chemical resistance, and the like. For example, multi-layer coatings often include a basecoat layer that can provide color and/or other visual effects and a topcoat layer, which sometimes comprises a clearcoat layer, and which provides an abrasion and scratch resistant layer. With respect to multi-layer coatings applied to metal substrates, such as automotive, aerospace, and architectural substrates, for example, a primer layer and/or a surface passivation layer may be applied to the bare metal substrate underneath overlying basecoats and topcoats. It would be advantageous to provide coating compositions that form coatings, including multi-layer coatings, characterized by improved coating properties.

SUMMARY OF THE INVENTION

A coating composition comprises a polymeric resin; an acid curing catalyst; and a 1,1-di-activated vinyl compound, or a multifunctional form thereof, or a combination thereof.

A multi-layer coating comprises a first coating layer applied over at least a portion of a substrate, and a second coating layer applied over at least a portion of the first coating layer. The second coating layer is formed from a coating composition comprising a carbamate-functional resin; an acid curing catalyst; and a 1,1-di-activated vinyl compound, or a multifunctional form thereof, or a combination thereof.

A multi-layer coating comprises a first coating layer applied over at least a portion of a substrate, a second coating layer applied over at least a portion of the first coating layer, and a third coating layer applied over at least a portion of the second coating layer. The second coating layer is formed from a coating composition comprising 1,1-di-activated vinyl compound, or a multifunctional form thereof, or a combination thereof. The third coating layer is formed from a coating composition comprising a carbamate-functional resin and an acid curing catalyst.

The process comprises applying a first coating layer over at least a portion of a substrate, applying a second coating layer over at least a portion of the first coating layer, and curing the applied first coating layer and the applied second coating layer. The second coating layer is applied using the coating composition comprising a polymeric resin; an acid curing catalyst, and a 1,1-di-activated vinyl compound, or a multifunctional form thereof, or a combination thereof.

It is understood that the invention described in this specification is not necessarily limited to the examples summarized in this Summary.

DETAILED DESCRIPTION OF THE INVENTION

As used in this specification, particularly in connection with coating layers or films, the terms "on," "onto," "over," and variants thereof (e.g., "applied over," "formed over," "deposited over," "provided over," "located over," and the like), mean applied, formed, deposited, provided, or otherwise located over a surface of a substrate, but not necessarily in contact with the surface of the substrate. For example, a coating layer "applied over" a substrate does not preclude the presence of one or more other coating layers of the same or different composition located between the applied coating layer and the substrate. Likewise, a second coating layer "applied over" a first coating layer does not preclude the presence of one or more other coating layers of the same or different composition located between the applied second coating layer and the applied first coating layer.

As used in this specification, the terms "polymer" and "polymeric" means prepolymers, oligomers, and both homopolymers and copolymers. As used in this specification, "prepolymer" means a polymer precursor capable of further reactions or polymerization by one or more reactive groups to form a higher molecular mass or crosslinked state.

As used in this specification, the prefix "poly" refers to two or more. For example, a "polyfunctional" molecule (whether a polymer, monomer, or other compound) comprises two or more reactive functional groups such as hydroxyl groups, amine groups, mercapto groups, carbamate groups, and the like. More specifically, "polyol" means a compound comprising two or more hydroxyl groups, "polyamine" means a compound comprising two or more amine groups, "polythiol" means a compound comprising two or more mercapto groups, and "polycarbamate" means a compound comprising two or more carbamate groups.

A polyfunctional compound such as a polyol, polyamine, polythiol, or polycarbamate may be a polymer, but does not have to be a polymer, and may comprise, for example, non-polymeric compounds. A polymeric polyol, polymeric polyamine, polymeric polythiol, or polymeric polycarbamate respectively comprises two or more pendant and/or terminal hydroxyl, amine, mercapto, or carbamate functional groups on the polymer molecules. A "pendant group" refers to a group that comprises an offshoot from the side of a polymer backbone and which does not comprise part of the polymer backbone, whereas "terminal group" refers to a group on an end of a polymer backbone and which comprises part of the polymer backbone.

Additionally, the terms polyol, polyamine, polythiol, and polycarbamate may encompass compounds comprising combinations of different types of functional groups. For example, a compound comprising two or more hydroxyl groups and two or more carbamate groups may be referred to as a polyol, a polycarbamate, or a polyol/polycarbamate. Furthermore, polyol, polyamine, polythiol, and polycarbamate compounds may comprise either or both the neutral functional groups (hydroxyl, amine, mercapto, or carbamate) and/or a salt of an ionized form of the functional group (e.g., alkoxide salts, ammonium salts, and the like).

As used in this specification, the term "1,1-di-activated vinyl compound" means a compound comprising a vinyl group having two electron withdrawing groups (EWG) covalently bonded to one of the π-bonded carbons and no substituents covalently bonded to the other π-bonded carbon (i.e., -EWG-C($=$CH$_2$)-EWG-), wherein the electron withdrawing groups independently comprise halogen groups, haloalkyl groups, carbonyl-containing groups (e.g., esters, amides, aldehydes, ketones, acyl halides, carboxylic/carboxylate groups), cyano groups, sulfonate groups, ammonium groups, quaternary amine groups, or nitro groups. The term "multifunctional form" means a compound comprising two or more 1,1-di-activated vinyl groups covalently bonded in one molecule. For instance, a dialkyl methylene malonate is an example of a 1,1-di-activated vinyl compound, and a transesterification adduct of a dialkyl methylene malonate and a polyol is an example of a multifunctional form of a dialkyl methylene malonate.

In basecoat-plus-clearcoat systems, and other coating systems comprising multiple coating layers formed from different coating compositions, the different chemical compositions that form the constituent layers should be mutually compatible in order to effectively provide the desired properties in the cured system. For example, in systems that include a basecoat layer providing color and/or other visual effects and a clearcoat layer providing an abrasion-resistant and/or solvent-resistant or other chemical-resistant (e.g., water-resistant) layer over the basecoat layer, the chemical compositions forming the basecoat and the clearcoat should be chemically compatible so that the cured coating system is aesthetically acceptable and provides the desired level of abrasion and/or chemical resistance.

Some basecoat formulations, particularly one-component (1K) water-based formulations, contain appreciable levels of amine compounds, including tertiary amine compounds such as, for example, dimethylethanolamine. Additionally, some clearcoat formulations, particularly 1K solvent-based clearcoating compositions, contain acid catalysts to catalyze crosslinking reactions between constituent polymeric resins and/or crosslinking agents during curing procedures such as baking at elevated temperatures. It has been observed that coating systems comprising amine-containing basecoating compositions and acid catalyst-containing clearcoating compositions exhibit a "wrinkling" effect in the coating layers when cured. While not intending to be bound by any theory, it is believed that when such coating systems are cured by baking at elevated temperatures, the amine compounds can volatilize and migrate out of the basecoat layers and into the overlying clearcoat layers, where the alkaline amines can react with the acid catalysts and form salts. It is believed that the salt-forming reaction between the migrated amine compounds and the acid compounds in the clearcoat layers causes the crosslinking resin to wrinkle.

The formation of wrinkles in cured coating systems, including basecoat-plus-clearcoat systems, is disadvantageous because the resulting lack of surface smoothness and low gloss are generally considered unaesthetic in many applications including, in particular, automotive paint applications. However, coating compositions comprising 1,1-di-activated vinyl compounds, or multifunctional forms thereof, or combinations thereof, when applied over underlying coating layers containing amine compounds, substantially reduce or eliminate the development of wrinkles in cured coating systems.

As used in this specification, the terms "cure" and "curing" refer to the chemical crosslinking of components in a coating composition applied as a coating layer over a substrate. Accordingly, the terms "cure" and "curing" do not encompass solely physical drying of coating compositions through solvent or carrier evaporation. In this regard, the term "cured," as used in this specification, refers to the condition of a coating layer in which at least one of the components of the coating composition forming the layer has chemically reacted to form new covalent bonds in the coating layer.

The invention described in this specification includes coating compositions that contain a polymeric resin, an acid curing catalyst that catalyzes crosslinking reactions involving the polymeric resin, and a 1,1-di-activated vinyl compound, or a multifunctional form thereof, or a combination thereof. The 1,1-di-activated vinyl compound, or a multifunctional form thereof, or a combination thereof, may be present in the coating compositions in an amount of 0.5-50.0% by total weight of the coating composition, or any sub-range subsumed therein, such as, for example, 0.5-15.0%, 1.0-14.0%, 2.0-13.0%, 3.0-12.0%, 4.0-11.0%, or 5.0-10.0%.

While not intending to be bound by any theory, it is believed that the 1,1-di-activated vinyl compounds and/or the multifunctional forms thereof can function as an amine scavenger that reacts with residual amine from underlying and/or overlying coating layers and decreases the amount of amine available to react the acid curing catalyst and thereby reduces or eliminates wrinkling in cured coating layers formed from the coating compositions. For example, the amine can initiate (1) self-polymerization reactions of the 1,1-di-activated vinyl compounds and/or the multifunctional forms thereof, and/or (2) Michael addition reactions between the 1,1-di-activated vinyl compounds and/or the multifunctional forms thereof and hydroxyl, amine, mercapto, and/or carbamate groups in the polymeric resin, which prevents the amine from reacting with the acid curing catalyst and causing wrinkling. Additionally, the acid curing catalyst may further promote self-polymerization reactions and/or Michael addition reactions involving the 1,1-di-activated vinyl compounds and/or the multifunctional forms thereof, which can promote multiple-curing mechanisms in applied coating layers. The 1,1-di-activated vinyl compounds and/or the multifunctional forms thereof present in the coating compositions can therefore function as secondary crosslinking/curing agents for polyfunctional polymeric resins, in addition to the primary acid-catalyzed curing mechanism of the polymeric resin, and thus provide a multiple-cure mechanism.

The 1,1-di-activated vinyl compounds can comprise methylene dicarbonyl compounds, dihalo vinyl compounds, dihaloalkyl disubstituted vinyl compounds, or cyanoacrylate compounds, or multifunctional forms of any thereof, or combinations of any thereof. Examples of 1,1-di-activated vinyl compounds and multifunctional forms thereof that can be used in the coating compositions are described in U.S. Pat. Nos. 8,609,885; 8,884,051; 9,108,914; 9,181,365; and 9,221,739, which are incorporated by reference into this specification. Additional examples of 1,1-di-activated vinyl compounds and multifunctional forms thereof that can be used in the coating compositions are described in U.S. Publication Nos. 2014/0288230; 2014/0329980; and 2016/0068618, which are incorporated by reference into this specification.

The coating compositions can comprise a 1,1-di-activated vinyl compound comprising a methylene malonate. Methylene malonates are compounds having the general formula (I):

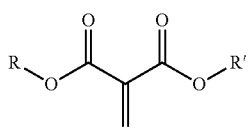

(I)

wherein R and R' may be the same or different and may represent nearly any substituent or side-chain, such as substituted or unsubstituted alkyl or aryl groups. For example, the coating compositions can comprise a dialkyl methylene malonate, a diaryl methylene malonate, a multifunctional form of a dialkyl methylene malonate, or a multifunctional form of a diaryl methylene malonate, or a combination of any thereof.

A multifunctional form of a methylene malonate can comprise a transesterification adduct of the methylene malonate and a polyol. A multifunctional form of a methylene malonate can thus have the general formula (II):

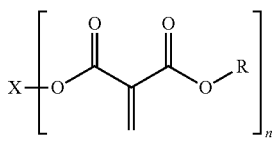

(II)

wherein n is greater than one, X is a polyol residue and each R may be the same or different, as described above. As used herein the term "residue" refers to a group derived from the respective compound. For instance, in the above formula, X is an n-valent group derived from a polyol by a transesterification reaction involving methylene malonate and n hydroxyl groups of said polyol. Likewise, a polymer comprising residues of a certain compound is obtained from polymerizing said compound.

In some examples, a multifunctional form of a methylene malonate can comprise a transesterification adduct of the methylene malonate and a diol, and thus have the general formula (III):

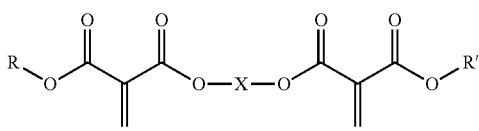

(III)

wherein X is a diol residue and R and R' may be the same or different, as described above.

Polyols that are suitable for the production of a transesterification adduct with a methylene malonate include, for example, polymeric polyols (such as polyether polyols, polyester polyols, acrylic polyols, and polycarbonate polyols) and monomeric polyols (such as alkane polyols, including alkane diols such as 1,5-pentanediol and 1,6-hexanediol). Examples of transesterification adducts of methylene malonates and polyols that may be used in the coating compositions are described in U.S. Publication No. 2014/0329980 and U.S. Pat. No. 9,416,091, which are incorporated by reference herein.

In some examples, the coating compositions can comprise dimethyl methylene malonate (D3M), a multifunctional form of D3M, or both. In some examples, the coating compositions can comprise diethyl methylene malonate (DEMM), a multifunctional form of DEMM, or both. The multifunctional forms of D3M or DEMM can comprise transesterification adducts of D3M or DEMM and a polyol, such as, for example, 1,5-pentanediol or 1,6-hexanediol and include, for example, transesterification adducts of D3M and 1,5-pentanediol and/or 1,6-hexanediol as well as transesterification adducts DEMM and and 1,5-pentanediol and/or 1,6-hexanediol.

In some examples, the coating compositions can comprise a combination of a dialkyl methylene malonate and a multifunctional form of a dialkyl methylene malonate. The coating compositions can comprise, for example, DEMM and a multifunctional form of DEMM comprising a transesterification adduct of DEMM and at least one polyol. The DEMM can be transesterified with polyol comprising, for example, an alkane diol such as 1,5-pentanediol or 1,6-hexanediol.

As described above, the coating compositions comprise a polymeric resin. The polymeric resin can comprise a polyfunctional polymeric resin comprising two or more pendant and/or terminal functional groups per polymer molecule in the resin. The polymeric resin can comprise a carbamate-functional resin, an epoxy-functional resin, or an amino-functional resin. In some examples, the polymeric resin may comprise polymer molecules comprising any combination of pendant and/or terminal carbamate groups, epoxy groups, or amino groups. In some examples, the coating compositions may also comprise a polysiloxane resin, an aminoplast resin, a phenolic resin, or a combination of any thereof.

The polymeric resin can comprise a polyfunctional polymeric resin comprising, for example, a carbamate-functional acrylic resin, a carbamate-functional and hydroxyl-functional acrylic resin (i.e., acrylic polymer molecules comprising pendant and/or terminal carbamate group and hydroxyl groups), an epoxy-functional acrylic resin, an amino-functional acrylic resin, a carbamate-functional polyester resin, a carbamate-functional and hydroxyl-functional polyester resin, an epoxy-functional polyester resin, an amino-functional polyester resin, a carbamate-functional polyether resin, a carbamate-functional and hydroxyl-functional polyether resin, an epoxy-functional polyether resin, an amino-functional polyether resin, a carbamate-functional polycarbonate resin, a carbamate-functional and hydroxyl-functional polycarbonate resin, an epoxy-functional polycarbonate resin, an amino-functional polycarbonate resin, a carbamate-functional polythioether resin, a carbamate-functional and hydroxyl-functional polythioether resin, an epoxy-functional polythioether resin, an amino-functional polythioether resin, a carbamate-functional polyurethane resin, a carbamate-functional and hydroxyl-functional polyurethane resin, an epoxy-functional polyurethane resin, an amino-functional polyurethane resin, a carbamate-functional polyurea resin, a carbamate-functional and hydroxyl-functional polyurea resin, an epoxy-functional polyurea resin, an amino-functional polyurea resin, a carbamate-functional polysiloxane resin, a carbamate-functional and hydroxyl-functional polysiloxane resin, an epoxy-functional polysiloxane resin, or an amino-functional polysiloxane resin, or a combination of any thereof. In addition to the polyfunctional polymeric resin, the coating composition can comprise a phenolic resin (e.g., a phenol-formaldehyde resin) or an aminoplast resin (e.g., a melamine-formaldehyde resin, optionally, butylated and/or methylated).

In some specific examples, the coating composition can comprise a carbamate-functional polymeric resin. The carbamate-functional polymeric resin can comprise a carbamate-functional acrylic resin. The carbamate-functional polymeric resin can comprise a carbamate-functional and hydroxy-functional polymeric resin, such as, for example, a carbamate-functional and hydroxy-functional acrylic resin. Examples of carbamate-functional polymeric resins that can be formulated in the coating compositions include, for example, polymeric resins produced by the transcarbamylation of a polymeric polyol with an alkyl carbamate (i.e., the transesterification of the alkyl carbamate with the polyol). In addition to the carbamate-functional polymeric resin, the coating composition can comprise an aminoplast resin, such as, for example, melamine-formaldehyde resin (optionally, butylated and/or methylated).

In some example, the coating composition can comprise a polymeric resin comprising one or more of the resins described in U.S. Pat. No. 5,532,061; U.S. Publication No. 2005/0014869 A1; and U.S. Pat. No. 7,005,472 B2, which are each incorporated by reference into this specification.

As described above, the coating compositions comprise an acid curing catalyst that catalyzes crosslinking reactions involving the polymeric resin (and any optional crosslinking agents or other resins present in the coating compositions, such as, for example, a melamine-formaldehyde resin). In some examples, the acid promoter can comprise a strong acid. As used in this specification, the term "strong acid" means an acid having a $pK_a$ in water at 25° C. of less than −1.3 and, for protic acids, at least one proton ($H^+$) that completely dissociates in aqueous solution. Strong acid promoters that can be formulated in the curable compositions include, for example, inorganic strong acids and organic strong acids. Suitable inorganic strong acids include, for example, mineral acids (e.g., hydrochloric acid, perchloric acid, sulfuric acid, and nitric acid) and heteropoly acids (e.g., phosphotungstic acid, phosphomolybdic acid, silicotungstic acid, and silicomolybdic acid). Suitable organic strong acids include, for example, sulfonic acids (e.g., p-toluenesulfonic acid, methanesulfonic acid, and dodecylbenzenesulfonic acid). Combinations of any strong acids (e.g., a mixture of a sulfonic acid and a heteropoly acid) may also be formulated in the curable compositions In addition to catalyzing crosslinking reaction involving the polymeric resin (e.g., reactions between a carbamate-functional polymeric resin and a melamine-formaldehyde resin), the acid curing catalyst may also catalyze or otherwise promote reactions involving the 1,1-di-activated vinyl compound and/or multifunctional form thereof. Without intending to be bound by any theory, it is believed that acids may function as Lewis acids in the coating compositions and complex to the 1,3-dicarbonyl motif in the 1,1-di-activated vinyl compound and/or multifunctional form thereof, thereby promoting a Michael addition reaction between functional groups on the polymeric resin component (e.g., carbamate, hydroxyl, or amino groups) and the vinyl groups in the 1,1-di-activated vinyl compound and/or multifunctional form thereof.

The invention described in this specification further includes a process for coating a substrate. The process comprises applying a first coating layer over at least a portion of a substrate, applying a second coating layer over at least a portion of the first coating layer, and curing the applied first coating layer and the applied second coating layer. The second coating layer is applied using the coating composition described above, e.g., comprising a polymeric resin; an acid curing catalyst; and a 1,1-di-activated vinyl compound, or a multifunctional form thereof, or a combination thereof, as described above.

The invention described in this specification further includes a multi-layer coating. The multi-layer coating comprises a first coating layer applied over at least a portion of a substrate, and a second coating layer applied over at least a portion of the first coating layer. The second coating layer is formed from the coating composition described above, e.g., comprising a carbamate-functional resin; an acid curing catalyst; and a 1,1-di-activated vinyl compound, or a multifunctional form thereof, or a combination thereof.

The first coating layer can be formed from a coating composition comprising a film-forming resin. For example, coating compositions that can be used to apply and thereby produce the first coating layer of a multi-layer coating include, for example, polyurethane-based coating compositions, polyurea-based coating compositions, acrylic-based coating compositions, epoxy-based coating compositions, polyester-based coating compositions, polyether-based coating compositions, polythioether-based coating compositions, polyamide-based coating compositions, polycarbonate-based coating compositions, polycarbamate-based coating compositions, and aminoplast-based coating compositions (including coating compositions comprising urea-formaldehyde and/or melamine-formaldehyde resins), and combinations of any thereof. In some examples, the first coating layer is applied and formed from a coating composition comprising a film-forming resin comprising a polyester resin, an acrylic resin, or a melamine-formaldehyde resin (optionally, butylated and/or methylated), or a combination of any thereof.

In some examples, the first coating layer is applied and formed from a water-based coating composition comprising a water-borne film-forming resin. The water-borne film-forming resin may comprise a polyester resin, an acrylic resin, or a melamine-formaldehyde resin (optionally, butylated and/or methylated), or a combination of any thereof. In some examples, the first coating layer comprises a coating composition that does not comprise (i.e., is substantially free of) phenolic resins and/or aminoplast resins (including melamine-based resin and other formaldehyde condensates). The term "substantially free," as used in this specification, means that the described materials are present, if at all, at incidental impurity levels, generally less than 1000 parts per million (ppm) by weight based on total coating composition weight. The first coating layer can comprise a coating composition that cures when heated at a temperature of less than 500° C., less than 200° C., less than 150° C., less than 140° C., less than 130° C., less than 120° C., less than 100° C., or less than 90° C.

The coating composition used to apply and form the first coating layer may comprise an amine compound. As described above, it is believed that a salt-forming reaction between amine compounds that migrate from underlying coating layers (like the first coating layer) into overlying coating layers comprising acid compounds (like the second coating layer) during curing can cause the development of wrinkles in the overlying coating layer. However, again without wishing to be bound by any theory, it is believed that the 1,1-di-activated vinyl compound, or a multifunctional form thereof, or a combination thereof, in the coating composition forming the overlying coating layer (i.e., the second coating layer) can function as an amine scavenger that prevents the amine compounds from reacting with acid in the second coating layer and thereby reduces or eliminates wrinkling. Accordingly, the coating compositions described above, which can form the second coating layer of a multi-layer coating, are particularly suitable for use over first coating layers formed from coating compositions comprising amine compounds.

In some examples, the coating composition forming the first coating layer can comprise a primary amine (e.g., an alkyl amine), a secondary amine (e.g., diisopropylamine—DIPA), or a tertiary amine (e.g., dimethylethanolamine—DMEA), or a combination of any thereof. In some examples, the coating composition forming the first coating layer comprises a tertiary amine such as, for example, DMEA (i.e., 2-(dimethylamino)ethanol—DMAE); 1,4-diazabicyclo[2.2.2]octane (DABCO); 2-piperazin-1-ylethylamine; N,N,N',N'-tetrakis(2-hydroxypropyl)ethylenediamine; 2-[2-(dimethylamino)ethoxy]ethanol; 1-[bis[3-(dimethylamino)propyl]amino]-2-propanol; N,N,N',N'',N''-pentamethyldiethylenetriamine; N,N,N',N'-tetraethyl-1,3-propanediamine; N,N,N',N'-tetramethyl-1,4-butanediamine; N,N,N',N'-tetramethyl-1,6-hexanediamine; 1,4,8,11-tetramethyl-1,4,8,11-tetraazacyclotetradecane; 1,3,5-trimethylhexahydro-1,3,5-triazine; methyl dicocoamine; 1,8-diazabicycloundec-7-ene (DBU); 1,5-diazabicyclo-[4,3,0]-non-5-ene (DBN); 1,1,3,3-tetramethylguanidine; or combinations of any thereof.

In some examples, the coating composition forming the first coating layer can comprise 2-15% of an amine compound based on the total solids weight of the coating composition. The amine compound may have a standard boiling point temperature of less than 165° C. The amine compound may have a pKa greater than 9.5, measured in water at 25° C. and 1 atmosphere pressure. In some examples, the amine compound may comprise a tertiary amine compound such as, for example, DMEA/DMAE, as described above.

The first coating layer and the second coating layer can be applied over at least a portion of a bare substrate or a pre-applied coating (e.g., a primer coating) using application techniques such as spraying, electrostatic spraying, dipping, rolling, brushing, electrocoating, and the like. Once applied, the first coating layer and the second coating layer can be dehydrated and/or cured. The curing of the first coating layer and the second coating layer can be performed sequentially (i.e., the first coating layer is cured before the application of the second coating layer) or simultaneously with or without intermediate flashing, drying, or dehydrating steps. For example, the first coating layer can be applied and dehydrated, the second coating layer can be applied over the dehydrated first coating layer, and both the first and second coating layers baked or otherwise treated to cure the multi-layer system.

The specific curing conditions of the coating layers will be based, at least in part, on the chemical formulation of the coating composition forming the layers. In some examples, the first coating layer and/or the second coating layer can be dehydrated and/or cured, independently or together, at temperatures ranging from ambient temperature (about 20° C. to 25° C.) to 500° C. or any sub-range subsumed therein, for example, from ambient temperatures to 200° C., from ambient temperatures to 150° C., from ambient temperatures to 140° C., from ambient temperatures to 130° C., from ambient temperatures to 120° C., from ambient temperatures to 100° C., from ambient temperatures to 90° C., from ambient temperatures to 80° C., from ambient temperatures to 60° C., or from ambient temperatures to 50° C.

The coating compositions described in this specification (e.g., comprising a polymeric resin; an acid curing catalyst; and a 1,1-di-activated vinyl compound, or a multifunctional form thereof, or a combination thereof, as described above) can further comprise additional materials such as additional resins, solvents, reactive diluents, colorants, and the like. Likewise, the coating compositions used to form the first layer of a multi-layer coating underlying a second layer formed from the coating compositions described above (e.g., a water-based, amine-containing, coating composition comprising a polyester resin, an acrylic resin, and/or a melamine-formaldehyde resin) can further comprise additional materials such as additional resins, solvents, reactive diluents, colorants, and the like. As used herein, "colorant" means any substance that imparts color and/or other opacity and/or other visual effect to the coating composition, particularly when applied over a substrate and cured. A colorant can be added to the coating composition in any suitable form, such as discrete particles, dispersions, solutions, and/or flakes. A single colorant or a mixture of two or more colorants can be used in the coatings compositions described in this specification.

Example colorants include pigments (organic or inorganic), dyes, and tints, such as those used in the paint industry and/or listed by the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coating by use of a grind vehicle, such as an acrylic grind vehicle, the use of which will be familiar to persons skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures of any thereof. The terms "pigment" and "colored filler" can be used interchangeably. Example dyes include, but are not limited to, those that are solvent and/or aqueous based such as phthalo green or blue, iron oxide, bismuth vanadate, anthraquinone, perylene, and quinacridone.

Example tints include, but are not limited to, pigments dispersed in water-based or water miscible carriers such as AQUA-CHEM 896 (available from Degussa, Inc.), and CHARISMA COLORANTS and MAXITONER INDUSTRIAL COLORANTS (available from the Accurate Dispersions Division of Eastman Chemical Company).

A colorant optionally formulated in the coating compositions can also comprise a special effect composition or pigment. As used herein, a "special effect composition or pigment" means a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Examples of special effect compositions can include transparent coated mica and/or synthetic mica, coated silica, coated alumina, aluminum flakes, a transparent liquid crystal pigment, a liquid crystal coating, and combinations of any thereof.

Other examples of materials that can be formulated in the coating compositions include plasticizers, abrasion resistant particles, anti-oxidants, hindered amine light stabilizers, UV light absorbers and stabilizers, surfactants, flow and surface control agents, thixotropic agents, solvents and co-solvents, reactive diluents, catalysts, reaction inhibitors, and other customary auxiliaries in the paint and coating industry.

In some examples, the first coating layer comprises a basecoat and the second coating layer comprises a clearcoat. As used in this specification, the term "basecoat" means a coating layer that is deposited onto a primer and/or directly onto a substrate, optionally including components (such as pigments) that impact the color and/or provide other visual impact. As used in this specification, the term "topcoat" means a coating layer that is deposited over another coating layer such as a basecoat. Topcoats are often, but not always, "clearcoats," which as used in this specification means a coating layer that is at least substantially transparent or fully transparent to visible light. As used in this specification, the term "substantially transparent" refers to a coating wherein a surface beyond the coating is at least partially visible to the naked eye when viewed through the coating. As used in this specification, the term "fully transparent" refers to a coating wherein a surface beyond the coating is completely visible to the naked eye when viewed through the coating. It is appreciated that a clearcoat can comprise colorants, such as pigments, provided that the colorants do not interfere with the desired transparency of the clearcoat layer. In some examples, a clearcoat layer is free of added colorants such as pigments. As used in this specification, the term "tiecoat" means a coating layer that is located between two other coating layers, such as, for example, a coating layer located between a basecoat layer and a topcoat layer.

In examples where the coating composition comprises a polymeric resin; an acid curing catalyst, and a 1,1-di-activated vinyl compound, or a multifunctional form thereof, or a combination thereof, as described above, and the coating composition is formulated as a clearcoat, the clearcoat can be applied as the second coating layer over a first coating layer comprising a low-temperature cure basecoat. As used herein, a "low-temperature cure basecoat" is formed from a coating composition that cures at a temperature of 140° C. or less. Examples of low-temperature cure basecoats include, for example, keto-hydrazide basecoat compositions, acid-carbodiimide basecoat compositions, and combinations thereof.

Suitable keto-hydrazide basecoat compositions, acid-carbodiimide basecoat compositions, and combinations thereof can comprise a latex resin comprising an aqueous colloidal dispersion of core-shell particles. The core-shell particles can comprise a polymeric core comprising a (meth)acrylate polymer, a vinyl polymer, or a combination thereof. As used herein, the term "(meth)acrylate" refers to both the methacrylate and the acrylate. The core-shell particles can comprise a polymeric shell comprising a polyurethane with a polymeric backbone that includes urethane linkages and urea linkages. The polymeric core and/or polymeric shell can also comprise keto functional groups, aldo functional groups, carboxylic acid functional groups (including carboxylate salts thereof such as amine salts), or combinations of any thereof.

The core-shell particles can be prepared with: (i) ethylenically unsaturated monomers; (ii) polyurethane prepolymers comprising isocyanate functional groups, carboxylic acid functional groups, and ethylenically unsaturated groups; and (iii) the Michael addition reaction product of a diamine and keto- and/or aldo-containing unsaturated monomers. The resulting core-shell particles can comprise a polymeric core prepared from the ethylenically unsaturated monomers that is chemically bonded to at least a portion of a polyurethane shell having pendant carboxylic acid functional groups, pendant keto and/or aldo functional groups, urethane linkages, and urea linkages. The polymeric core can also include pendant and/or terminal functional groups, such as keto and/or aldo functional groups, by using ethylenically unsaturated monomers that comprise keto and/or aldo functional groups.

The core-shell particles can also be prepared with: (i) ethylenically unsaturated monomers; (ii) polyurethane prepolymers comprising isocyanate functional groups, carboxylic acid functional groups, terminal keto and/or aldo functional groups, and, optionally, ethylenically unsaturated groups; and (iii) a diamine. The resulting core-shell particles comprise a polymeric core prepared from the ethylenically unsaturated monomers and a polyurethane shell having pendant carboxylic acid functional groups, terminal keto and/or aldo functional groups, urethane linkages, and urea linkages. The polymeric core can also include pendant and/or terminal functional groups, such as keto and/or aldo functional groups, by using ethylenically unsaturated monomers that comprise keto and/or aldo functional groups. Further, the polymeric core can be chemically bonded to at least a portion of the polymeric shell if the polyurethane prepolymer comprises ethylenically unsaturated groups.

A basecoat composition can comprise the core-shell particles and suitable crosslinker compounds comprising two or more functional groups that are reactive with the keto functional groups, aldo functional groups, and/or carboxylic acid functional groups on the latex particles. Examples of suitable crosslinker compounds include polyhydrazides, which are reactive with keto and aldo functional groups, and polycarbodiimides, which are reactive with carboxylic acid functional groups. The crosslinker compounds can react with the core-shell particles to cure coating layers formed from the basecoat composition.

The invention described in this specification further includes a multi-layer coating comprising three layers: a first coating layer applied over at least a portion of a substrate; a second coating layer applied over at least a portion of the first coating layer; and a third coating layer applied over at least a portion of the second coating layer. The second coating layer is formed from a coating composition comprising a 1,1-di-activated vinyl compound, or a multifunctional form thereof, or a combination thereof. The third coating layer is formed from a coating composition comprising a carbamate-functional resin and an acid curing catalyst. In some examples, the first coating layer may be formed from a coating composition comprising an amine compound, as described above, such as, for example, a water-based, amine-containing, coating composition comprising a polyester resin, an acrylic resin, and/or a melamine-formaldehyde resin. While not intending to be bound by any theory, it is believed that the second coating layer (which functions as a tiecoat layer between the first and third layers) provides a polymerized and crosslinked barrier that prevents residual amine in the first coating layer from migrating into the overlying third coating layer and reacting with the acid curing catalyst. The tiecoat layer therefore likely prevents the development of wrinkling in the clearcoat layer.

The amine in the underlying first coating layer can initiate (1) self-polymerization reactions of the 1,1-di-activated vinyl compounds and/or the multifunctional forms thereof, and/or (2) Michael addition reactions between the 1,1-diactivated vinyl compounds and/or the multifunctional forms thereof and hydroxyl, amine, mercapto, and/or carbamate groups in polyfunctional polymeric resins in the second coating layer, thereby forming a polymerized and cross-linked tiecoat layer that provides a barrier to amine migration into the overlying third coating layer, and prevents the amine from reacting with the acid curing catalyst and causing wrinkling. Thus, in some examples, the second coating layer comprises a polymerization reaction product of the 1,1-di-activated vinyl compound, or a multifunctional form thereof, or a combination thereof. Additionally, in some examples, the second coating layer may comprise Michael addition reaction products between the 1,1-di-activated vinyl compounds and/or the multifunctional forms thereof and hydroxyl, amine, mercapto, and/or carbamate groups in polyfunctional polymeric resins, for example, at the interface between the second coating layer and the first and/or third coating layers.

The "Addition Reaction product" refers to the adduct formed by the reaction of 1,1'-di-activated vinyl compound and/or multifunctional form thereof with a nucleophile (such as an amine, thiol or alcohol and/or their polymeric form). Without being bound to any theory, this may be the result of an addition of the nucleophile to the conjugate double bond ('the Michael Addition Reaction'), or displacing the alcohol of the ester of a 1,1-diactivated vinyl ester with a another alcohol (a trans-esterification reaction), an amine, a thiol and/or a polymeric form of them. For example, the reaction of an amine can result in an amide product and the reaction with a thiol can result in a thioester product. A "polymeric addition product" refers to the product of polymerization reaction, wherein a multitude of reactants react repetitively. Without being bound by any theory, this could be done through a variety of reaction mechanisms, such as anionic polymerization, condensation polymerization, chain growth or radical polymerization. For example, a primary amine can react 1,1'-diethyl methylene malonate (DEMM) via anionic polymerization to form polymeric-DEMM.

The multi-layer coatings described in this specification can further comprise a primer coating layer underneath the first, second, and third coating layers described above. As used in this specification, a "primer coating layer" means an undercoating that may be deposited onto a substrate in order to prepare the surface for application of a protective or decorative coating system. A primer coating layer can be formed over at least a portion of the substrate and a first coating layer (e.g., a basecoat) can be formed over at least a portion of the primer coating layer. As such, the multi-layer coating of the present invention can comprise a primer coating layer and one or more of a basecoat layer, tiecoat layer, and a topcoat layer. In such examples, the topcoat layer can comprise a clearcoat.

A primer coating layer can be formed from a coating composition that comprises a film-forming resin such as a cationic based resin, an anionic based resin, and/or any of the additional film-forming resins previously described. The coating composition used to form the primer coating composition can include a corrosion inhibitor, particularly in coating formulations intended for use on metallic substrates. As used in this specification, a "corrosion inhibitor" means a component reduces the rate or severity of corrosion of a surface on a metal or metal alloy substrate.

A corrosion inhibitor can include, but is not limited to, an alkali metal component, an alkaline earth metal component, a transition metal component, or combinations of any thereof. The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), zirconium (Zr), chromium (Cr), and zinc (Zn), among various others. Examples of inorganic components that can function as corrosion inhibitors in primer coating compositions include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and combinations thereof.

The components of a primer coating composition can be selected to form an electrodepositable coating composition. As used in this specification, the term "electrodepositable coating composition" refers to a coating composition that is capable of being deposited onto an electrically conductive substrate under the influence of an applied electrical potential. Examples of electrodepositable coating compositions include anionic and cationic electrodepositable coating compositions, such as epoxy or polyurethane-based coatings, such as the electrodepositable coatings described in U.S. Pat. No. 4,933,056 at column 2, line 48 to column 5, line 53; U.S. Pat. No. 5,530,043 at column 1, line 54 to column 4, line 67; U.S. Pat. No. 5,760,107 at column 2, line 11 to column 9, line 60; and U.S. Pat. No. 5,820,987 at column 3, line 48 to column 10, line 63, each of which is incorporated by reference into this specification. Suitable electrodepositable coating compositions also include those commercially available from PPG Industries, Inc., such as the POWERCRON® series of anodic and cathodic epoxy and acrylic coatings, ED-6060C, ED-6280, ED-6465, and ED-7000, for example.

As described above, a primer coating composition can be deposited directly over at least a portion of a substrate before application of a first coating layer. The first coating layer can be deposited over a cured primer coating layer where the first coating layer functions as a basecoat layer, and a second coating layer deposited over the first coating layer where the second coating layer functions as a topcoat layer or a tiecoat layer (when a subsequent third layer is applied over the second coating layer). Once a primer coating composition is applied to at least a portion of a substrate, the primer coating layer can be dehydrated and/or cured before applying an overcoating layer. A primer coating composition can be dehydrated and/or cured, for example, at a temperature of 175° C. to 205° C. to form a primer coating layer.

The present invention further includes an article comprising the multi-layer coatings formed from the coating compositions described in this specification. For example, the coating compositions can be applied to a wide range of substrates including vehicle components and components of free-standing structures such as buildings, bridges, or other civil infrastructures. More specific substrates include, but are not limited to, automotive substrates (e.g., body panels and other parts and components), industrial substrates, aircraft components, watercraft components, packaging substrates (e.g., food and beverage cans), wood flooring and furniture, apparel, electronics (e.g., housings and circuit boards), glass and transparencies, sports equipment (e.g., golf balls, and the like), appliances (e.g., dish washing machines, clothes washing machines, clothes drying machines). Substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, fiberboard, cement, concrete, brick, stone, paper, cardboard, textiles, leather (both synthetic and natural), glass or fiberglass composites, carbon fiber composites, mixed fiber (e.g., fiberglass and carbon fiber) composites, and the like. "Green" polymers, in this context, refers to are polymers that are naturally occurring or synthetic polymers that biodegradable. A detailed description of "green" polymers is available in the Journal of Polymer Degradation and Stability, Volume 68, Issue 1, pages 1-7, and is incorporated here by reference. The substrate can be one that has been already treated in some manner, such as to impart visual and/or color effect, a protective pretreatment or primer coating layer, or other coating layer, and the like.

The coating compositions of the present invention are also suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. The coatings applied to the interior of metal cans also help prevent corrosion in the headspace of the cans, which is the area between the fill line of the product and the can lid, corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. Thus, the present "package" is distinguished from a storage container or bakeware in which a consumer might make and/or store food, such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is a metal can. The term "metal can" includes any type of metal can, container, or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including easy open ends, which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like. The coating can be applied to the interior and/or the exterior of the package.

In some examples, the coating compositions prepared and used according to the present invention may be substantially free, may be essentially free, and/or may be completely free of bisphenol A and epoxy compounds derived from bisphenol A ("BPA"), such as bisphenol A diglycidyl ether ("BADGE"). The term "substantially free" as used in this context means the coatings compositions contain less than 1000 parts per million (ppm), "essentially free" means less than 100 ppm, and "completely free" means less than 20 parts per billion (ppb) of any of the above mentioned compounds, derivatives, or residues thereof.

WORKING EXAMPLES

The following working examples are intended to further describe the invention. It is understood that the invention described in this specification is not necessarily limited to the examples described in this section.

Example 1: Preparation of Amine-Containing Basecoating System

Example 1A: Preparation of a First Amine-Containing Basecoating Composition

A red pigmented basecoating composition, suitable for use as a first basecoat layer in a multi-layer coating system, was prepared in the following manner. Components 1-9 listed in Table 1 below were mixed under stirring to form an aqueous phase mixture. The red tint paste (Component 10) and the white tint paste (Component 11) were then added to the aqueous phase mixture. Components 12-18 were mixed to form an organic phase mixture and stirred for 15 minutes before being added to the aqueous phase mixture. After mixing the aqueous and organic phase mixtures together, the pH of the combined mixture was adjusted to 8.6 using 50% dimethylethanolamine (also known as, 2-(dimethylamino) ethanol). The resulting basecoating composition ("Basecoating Composition A") was aged for 24 hours under ambient conditions before viscosity adjustment with demineralized water. The high shear viscosity of the basecoating composition was adjusted to 95 cps at 1000 sec$^{-1}$ using a Brookfield CAP 2000 viscometer with spindle #1.

TABLE 1

| No. | Component | Parts-by-weight |
|---|---|---|
| | Aqueous Phase Components | |
| 1 | Polyester A [1] | 496.3 |
| 2 | Latex A [2] | 439.2 |
| 3 | Latex B [3] | 577.0 |
| 4 | Demineralized water | 107.0 |
| 5 | Dimethylethanolamine | 1.2 |
| 6 | Byk 348 [4] | 2.2 |
| 7 | Byk 032 [5] | 16.4 |
| 8 | 2-Ethylhexanol | 158.6 |
| 9 | Mineral spirits | 36.5 |
| 10 | Red tint paste [6] | 1270.2 |
| 11 | White tint paste [7] | 3.6 |
| | Organic Phase Ingredients | |
| 12 | Urethane diol [8] | 82.8 |
| 13 | Resimene HM2608 [9] | 115.1 |
| 14 | Cymel 1158 [10] | 70.5 |
| 15 | Polyester B [11] | 46.1 |
| 16 | 2-Ethylhexanol | 23.7 |
| 17 | Ethylene glycol monobutyl ether | 77.1 |
| 18 | Propylene glycol monobutyl ether | 66.4 |

[1] Polyester A was made with 73 parts-by-weight of Empol® 1008 (available from BASF/Cognis), 2.6 parts-by-weight of trimellitic anhydride, 5.2 parts-by-weight of dimethylol propionic acid, and 19.1 parts-by-weight of 1,4 cyclohexane dimethanol, and had a weight average molecular weight (Mw) of 24,160 as measured by GPC, an acid value of 15.5, and a solids content of 20%.
[2] Latex A was made with 4.1 parts-by-weight dimethylethanolamine, 3.9 parts-by-weight hexanediol diacrylate, 9.7 parts-by-weight 2-ethylhexyl acrylate, 24.9 parts-by-weight methyl methacrylate, 5.9 parts-by-weight dimethylol propionic acid, 5.8 parts-by-weight hydroxyethyl methacrylate, 29.5 parts-by-weight polytetramethylene ether glycol (Mw = 1000), and 16.4 parts-by-weight isophorone diisocyanate, and had a solids content of 37.8% in water.
[3] Latex B was made with 0.2 parts-by-weight dimethyl ethanolamine, 8.8 parts-by-weight acrylamide, 63 parts-by-weight butyl acrylate, 25 parts-by-weight hexanediol diacrylate, 2 parts-by-weight methyl methacrylate, and 1 part-by-weight butyl acrylate, and had a solids content of 31% in water.
[4] A polyether-modified polysiloxane surfactant commercially available from Byk Chemie.
[5] A defoamer comprising an aqueous emulsion of paraffin-based mineral oils and hydrophobic components commercially available from Byk Chemie.
[6] Pigment dispersion as described in comparative Example 1 of U.S. Pat. No. 9,040,621.
[7] White tint paste comprising 61% TiO$_2$ dispersed in 9% aqueous acrylic polymer blend, and having a solids of 70%.
[8] The urethane diol was made with 70.1 parts-by-weight of poly oxypropylene diamine (Mw = 400) and 29.9 parts-by-weight of ethylene carbonate.
[9] An imino-type, methylated, melamine-formaldehyde resin commercially available from Ineos Melamines.
[10] An imino-type, n-butylated, melamine-formaldehyde resin commercially available from Allnex.
[11] Polyester B was made with 39.2 parts-by-weight isostearic acid, 23.8 parts-by-weight cyclohexane dicarboxylic acid, 37 parts-by-weight trimethylol propane, and had a number average molecular weight (Mn) of 726 and an acid value of 2.

Example 1B: Preparation of a Second Amine-Containing Basecoating Composition

A red pigmented basecoating composition, suitable for use as a second basecoat layer in a multi-layer coating system, was prepared in the following manner. Components 1-12 listed in Table 2 below were mixed under stirring to form an aqueous phase mixture. Components 13 and 14 were then mixed separately for about 20 minutes until the mixture was clear and then added to the rest of the aqueous phase components under stirring. Components 15-18 were mixed to form an organic phase mixture and stirred for 15 minutes prior to being added to the aqueous phase mixture. After mixing the aqueous and organic phase mixtures together, the pH of the combined mixture was adjusted to 8.8 using 50% dimethylethanolamine. The resulting basecoating composition ("Basecoating Composition B") was aged for 24 hours under ambient conditions before viscosity adjustment with demineralized water. The high shear viscosity of the Basecoat B composition was adjusted to 80 cps at 1000 sec$^{-1}$ using a Brookfield CAP 2000 viscometer with spindle #1.

TABLE 2

| No. | Components | Parts by weight |
|---|---|---|
| | Aqueous Phase Ingredients | |
| 1 | Polyester A | 643.6 |
| 2 | Latex A | 450.7 |
| 3 | Latex C [1] | 290.0 |
| 4 | Demineralized water | 86.7 |
| 5 | Dimethylethanolamine | 3.5 |
| 6 | Byk 348 | 1.46 |
| 7 | Byk 032 | 15.56 |
| 8 | 2-Ethylhexanol | 80.3 |
| 9 | Propylene glycol monobutyl ether | 76.4 |
| 10 | Mineral spirits | 119.7 |
| 11 | Red tint paste | 518.3 |
| 12 | Synolox 100-D45 [2] | 15.8 |
| 13 | Demineralized water | 583.9 |
| 14 | Laponite RD [3] | 11.7 |
| | Organic Phase Ingredients | |
| 15 | Resimene HM2608 | 221.5 |
| 16 | Aluminium paste [4] | 153.1 |
| 17 | Polyester B | 45.0 |
| 18 | Propylene glycol monobutyl ether | 141.6 |

[1] Latex C was made with 8.8 parts-by-weight of 50% acrylamide, 63 parts-by-weight n-butyl methacrylate, 25.6 parts-by-weight 1,6-hexanediol diacrylate, 1.7 parts-by-weight methyl methacrylate, 0.9 parts-by-weight n-butyl acrylate, and had a solids content of 25% in water.
[2] Polypropylene glycol available from Dow Chemical.
[3] Sodium lithium magnesium silicate available from Southern Clay Products.
[4] TSB 2180A aluminum paste available from Toyal America.

Example 2: Preparation of an Acid-Catalyzed Curable Clearcoating Composition

An acid-catalyzed curable clearcoating composition ("Clearcoating Composition"), suitable for use as a topcoat layer over a multi-layer basecoat system, was prepared by mixing the components listed in Table 3 under agitation in the listed order.

TABLE 3

| Components | Parts by weight |
|---|---|
| Methyl amyl ketone | 35.0 |
| TINUVIN 928 [1] | 3.0 |
| TINUVIN 123 [2] | 0.5 |
| Resimene 757 [3] | 41.24 |
| Flow additive [4] | 0.50 |
| Acid Catalyst [5] | 1.43 |
| Carbamate-functional acrylic resin [6] | 93.75 |

[1] 2-(2H-Benzotriazol-2yl)-6-(1-methyl-1-phenylethyl)-4-(1,1,3,3-tetramethylbutyl)phenol UV absorber available from Ciba Specialty Chemicals Corp.
[2] A sterically hindered amino ether light stabilizer available from Ciba Specialty Chemicals Corp.
[3] A methylated and n-butylated melamine-formaldehyde resin commercially available from Ineos Melamines.
[4] Polybutylacrylate (60 percent solids in xylene).
[5] Dodecylbenzenesulfonic acid, 70% by weight in isopropanol.
[6] The carbamate-functional acrylic resin was prepared as follows: A reaction flask equipped for vacuum distillation was flushed with N$_2$ and then added to the flask was 1670.2 parts-by-weight of an 88% acrylic polyol solution in 1-methoxy-2-propanol, where the acrylic polyol was prepared from 40% by weight hydroxy propyl acrylate and 60% by weight butyl methacrylate, 4.9 parts-by-weight of butyl stannoic acid, and 4.9 parts-by-weight triphenyl phosphite. The reaction mixture was placed under vacuum and heated to a temperature of 140° C. To the resulting reaction mixture was added, over a period of 3 hours, 1263.64 parts-by-weight of a 38% solution of 1-methoxy-2-propyl carbamate in 1-methoxy-2-propanol. The resulting distillate was collected. After the addition of the carbamate solution was completed, the temperature was increased to 150° C. and held at that temperature until distillation had stopped. The reaction mixture was cooled to 90° C. and brought to atmospheric pressure. The resulting carbamate-functional (and hydroxyl-functional) acrylic resin had a hydroxyl value of 34.48 and was diluted with 251.4 parts-by-weight of a 1:1 mixture of 1-methoxy-2-propanol and 3-ethoxy ethyl propionate.

Example 3: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat A multi-layer coating was prepared by applying a basecoat-tiecoat-topcoat system over steel panels. A water-based basecoat system comprising two coating layers was applied over a 4-inch by 12-inch cold-rolled steel substrate panel pre-coated with ED-6465 electrocoat (electrocoat available from PPG Industries, Inc., and substrate panels available in pre-coated form from ACT Test Panels LLC). The coating layers were applied under controlled conditions of 20-22° C. temperature and 60-65% relative humidity. The first coating layer of the basecoat system (Basecoating Composition A, described above in Example 1A) was sprayed over the electrocoat on the substrate panel using a Binks model 95AR Conventional Air Spray Gun with a 1.8 millimeter nozzle at 60 psi. The first coating layer of the basecoat system was allowed to dry for 5 minutes under ambient conditions.

The second coating layer of the basecoat system (Basecoating Composition B, described above in Example 1B) was sprayed over the dried first coating layer of the basecoat system using a Binks model 95AR Conventional Air Spray Gun with a 1.8 millimeter nozzle at 60 psi. The second coating layer was sprayed in two consecutive coats without any intermediate drying between spray applications. The two coating layers of the basecoat system where then allowed to dry for 5 minutes under ambient conditions and thereafter dehydrated for 7 minutes at 70° C. The film thickness of the basecoat system (all coating layers) after dehydrating was approximately 35 micrometers.

A tiecoat layer was applied over the dehydrated basecoat system. The tiecoating composition comprised a mixture of diethyl methylene malonate and a transesterification adduct of diethyl methylene malonate and 1,6-hexanediol, as described in U.S. Publication No. 2014/0329980. The tiecoating composition was applied over the dehydrated basecoat by drawdown bar with a 1 mil gap under ambient conditions. The tiecoating composition was drawn down over only half of the basecoated panel. The panel with the applied basecoat system and tiecoat layer was then held for 10 minutes under ambient conditions (an "Ambient Flash") and thereafter baked for 10 minutes at 80° C. (a "Dehydration Bake").

Within 10 minutes of application of the tiecoating composition (i.e., before the 80° C. bake), the surface of the tiecoat layer became tack-free and glossy under ambient conditions. A clearcoat layer (Clearcoating Composition, described above in Example 2) was sprayed over the entire baked panel using a Binks model 95AR Conventional Air Spray Gun with a 1.8 millimeter nozzle at 60 psi. The clearcoat layer was in direct contact with the underlying tiecoat layer on half of the panel, and the clearcoat layer was in direct contact with the underlying basecoat system on the other half of the panel. The clearcoat layer was applied with a film thickness of approximately 45 micrometers. The panel with the applied clearcoat layer was then baked for 30 minutes at 140° C. to cure the multi-layer coating system.

After curing, the panel was visually observed to evaluate wrinkling properties. The half of the cured panel having the intermediate tiecoat between the basecoat system and the clearcoat was smooth and glossy with no observable wrinkling. The half of the cured panel without the intermediate tiecoat between the basecoat system and the clearcoat exhibited visible wrinkling. While not intending to be bound by any theory, it is believed that the tiecoat layer provided a polymerized and crosslinked barrier that prevented residual dimethylethanolamine in the basecoat system from migrating into the overlying clearcoat layer and reacting with the dodecylbenzenesulfonic acid curing catalyst. The tiecoat layer therefore likely prevented the development of wrinkling in the clearcoat layer.

Example 4: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 3 was repeated, except that the Dehydration Bake was performed for 30 minutes instead of 10 minutes. After curing, the panel was visually observed to evaluate wrinkling properties. The half of the cured panel having the intermediate tiecoat between the basecoat system and the clearcoat was smooth and glossy with no observable wrinkling. The half of the cured panel without the intermediate tiecoat between the basecoat system and the clearcoat exhibited visible wrinkling. While not intending to be bound by any theory, it is believed that the tiecoat layer provided a polymerized and crosslinked barrier that prevented residual dimethylethanolamine in the basecoat system from migrating into the overlying clearcoat layer and reacting with the dodecylbenzenesulfonic acid curing catalyst. The tiecoat layer therefore likely prevented the development of wrinkling in the clearcoat layer.

Example 5: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 3 was repeated, except that the Dehydration Bake was performed for 60 minutes instead of 10 minutes. After curing, the panel was visually observed to evaluate wrinkling properties. The entire panel (both the halves, with and without the intermediate tiecoat between the basecoat system and the clearcoat) was smooth and glossy with no observable wrinkling. While not intending to be bound by any theory, it is believed that the extended length of the Dehydration Bake relative to Examples 3 and 4 was sufficiently long to allow a substantial portion of the dimethylethanolamine in the basecoat system to evaporate out and, as a result, there was little to no residual dimethylethanolamine left in the basecoat system to migrate into the overlying clearcoat layer and react with the dodecylbenzenesulfonic acid curing catalyst and cause wrinkling in the clearcoat layer.

Example 6: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 3 was repeated, except that the Ambient Flash was performed for 30 minutes instead of 10 minutes. After curing, the panel was visually observed to evaluate wrinkling properties. The half of the cured panel having the intermediate tiecoat between the basecoat system and the clearcoat was smooth and glossy with no observable wrinkling. The half of the cured panel without the intermediate tiecoat between the basecoat system and the clearcoat exhibited visible wrinkling. While not intending to be bound by any theory, it is believed that the tiecoat layer provided a polymerized and crosslinked barrier that prevented residual dimethylethanolamine in the basecoat system from migrating into the overlying clearcoat layer and reacting with the dodecylbenzenesulfonic acid curing catalyst. The tiecoat layer therefore likely prevented the development of wrinkling in the clearcoat layer.

Example 7: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 3 was repeated, except that the Ambient Flash was performed for 30 minutes instead of 10 minutes, and the Dehydration Bake was also performed for 30 minutes instead of 10 minutes. After curing, the panel was visually observed to evaluate wrinkling properties. The half of the cured panel having the intermediate tiecoat between the basecoat system and the clearcoat was smooth and glossy with no observable wrinkling. The half of the cured panel without the intermediate tiecoat between the basecoat system and the clearcoat exhibited visible wrinkling.

While not intending to be bound by any theory, it is believed that the tiecoat layer provided a polymerized and crosslinked barrier that prevented residual dimethylethanolamine in the basecoat system from migrating into the overlying clearcoat layer and reacting with the dodecylbenzenesulfonic acid curing catalyst. The tiecoat layer therefore likely prevented the development of wrinkling in the clearcoat layer. Additionally, it is believed that the extended lengths of the Ambient Flash and the Dehydration Bake were insufficiently long to allow enough of the dimethylethanolamine in the basecoat system to evaporate out and avoid causing wrinkling in the clearcoat applied over the half without the intermediate tiecoat.

Example 8: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 3 was repeated, except that the Ambient Flash was performed for 30 minutes instead of 10 minutes, and the Dehydration Bake was performed for 60 minutes instead of 10 minutes. After curing, the panel was visually observed to evaluate wrinkling properties. The entire panel (both the halves, with and without the intermediate tiecoat between the basecoat system and the clearcoat) was smooth and glossy with no observable wrinkling. While not intending to be bound by any theory, it is believed that the extended length of the Dehydration Bake was sufficiently long to allow a substantial portion of the dimethylethanolamine in the basecoat system to evaporate out and, as a result, there was little to no residual dimethylethanolamine left in the basecoat system to migrate into the overlying clearcoat layer and react with the dodecylbenzenesulfonic acid curing catalyst and cause wrinkling in the clearcoat layer.

Example 9: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 3 was repeated, except that the Ambient Flash was performed for 60 minutes instead of 10 minutes. After curing, the panel was visually observed to evaluate wrinkling properties. The half of the cured panel having the intermediate tiecoat between the basecoat system and the clearcoat was smooth and glossy with no observable wrinkling. The half of the cured panel without the intermediate tiecoat between the basecoat system and the clearcoat exhibited visible wrinkling.

While not intending to be bound by any theory, it is believed that the tiecoat layer provided a polymerized and crosslinked barrier that prevented residual dimethylethanolamine in the basecoat system from migrating into the overlying clearcoat layer and reacting with the dodecylbenzenesulfonic acid curing catalyst. The tiecoat layer therefore likely prevented the development of wrinkling in the clearcoat layer. Additionally, it is believed that the extended length of the Ambient Flash was insufficiently long to allow enough of the dimethylethanolamine in the basecoat system to evaporate out and avoid causing wrinkling in the clearcoat applied over the half without the intermediate tiecoat.

Example 10: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 3 was repeated, except that the Ambient Flash was performed for 60 minutes instead of 10 minutes, and the Dehydration Bake was performed for 30 minutes instead of 10 minutes. After curing, the panel was visually observed to evaluate wrinkling properties. The half of the cured panel having the intermediate tiecoat between the basecoat system and the clearcoat was smooth and glossy with no observable wrinkling. The half of the cured panel without the intermediate tiecoat between the basecoat system and the clearcoat exhibited visible wrinkling.

While not intending to be bound by any theory, it is believed that the tiecoat layer provided a polymerized and crosslinked barrier that prevented residual dimethylethanolamine in the basecoat system from migrating into the overlying clearcoat layer and reacting with the dodecylbenzenesulfonic acid curing catalyst. The tiecoat layer therefore likely prevented the development of wrinkling in the clearcoat layer. Additionally, it is believed that the extended lengths of the Ambient Flash and the Dehydration Bake were insufficiently long to allow enough of the dimethylethanolamine in the basecoat system to evaporate out and avoid causing wrinkling in the clearcoat applied over the half without the intermediate tiecoat.

Example 11: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 3 was repeated, except that the Ambient Flash was performed for 60 minutes instead of 10 minutes, and the Dehydration Bake was also performed for 60 minutes instead of 10 minutes. After curing, the panel was visually observed to evaluate wrinkling properties. The entire panel (both the halves, with and without the intermediate tiecoat between the basecoat system and the clearcoat) was smooth and glossy with no observable wrinkling. While not intending to be bound by any theory, it is believed that the extended length of the Dehydration Bake was sufficiently long to allow a substantial portion of the dimethylethanolamine in the basecoat system to evaporate out and, as a result, there was little to no residual dimethylethanolamine left in the basecoat system to migrate into the overlying clearcoat layer and react with the dodecylbenzenesulfonic acid curing catalyst and cause wrinkling in the clearcoat layer.

Example 12: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 3 was repeated, except that the tiecoating composition was applied over the dehydrated basecoat by drawdown bar with a 3 mil gap. The half of the cured panel having the intermediate tiecoat between the basecoat system and the clearcoat was smooth and glossy with no observable wrinkling. The half of the cured panel without the intermediate tiecoat between the basecoat system and the clearcoat exhibited visible wrinkling. While not intending to be bound by any theory, it is believed that the tiecoat layer provided a polymerized and crosslinked barrier that prevented residual dimethylethanolamine in the basecoat system from migrating into the overlying clearcoat layer and reacting with the dodecylbenzenesulfonic acid curing catalyst. The tiecoat layer therefore likely prevented the development of wrinkling in the clearcoat layer.

Example 13: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 4 was repeated, except that the tiecoating composition was applied over the dehydrated basecoat by drawdown bar with a 3 mil gap. The half of the cured panel having the intermediate tiecoat between the basecoat system and the clearcoat was smooth and glossy with no observable wrinkling. The half of the cured panel without the intermediate tiecoat between the basecoat system and the clearcoat exhibited visible wrinkling. While not intending to be bound by any theory, it is believed that the tiecoat layer provided a polymerized and crosslinked barrier that prevented residual dimethylethanolamine in the basecoat system from migrating into the overlying clearcoat layer and reacting with the dodecylbenzenesulfonic acid curing catalyst. The tiecoat layer therefore likely prevented the development of wrinkling in the clearcoat layer.

Example 14: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 5 was repeated, except that the tiecoating composition was applied over the dehydrated basecoat by drawdown bar with a 3 mil gap. After curing, the panel was visually observed to evaluate wrinkling properties. The entire panel (both the halves, with and without the intermediate tiecoat between the basecoat system and the clearcoat) was smooth and glossy with no observable wrinkling. While not intending to be bound by any theory, it is believed that the extended length of the Dehydration Bake was sufficiently long to allow a substantial portion of the dimethyl-ethanolamine in the basecoat system to evaporate out and, as a result, there was little to no residual dimethylethanolamine left in the basecoat system to migrate into the overlying clearcoat layer and react with the dodecylbenzenesulfonic acid curing catalyst and cause wrinkling in the clearcoat layer.

Example 15: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 6 was repeated, except that the tiecoating composition was applied over the dehydrated basecoat by drawdown bar with a 3 mil gap. After curing, the panel was visually observed to evaluate wrinkling properties. The half of the cured panel having the intermediate tiecoat between the basecoat system and the clearcoat was smooth and glossy with no observable wrinkling. The half of the cured panel without the intermediate tiecoat between the basecoat system and the clearcoat exhibited visible wrinkling. While not intending to be bound by any theory, it is believed that the tiecoat layer provided a polymerized and crosslinked barrier that prevented residual dimethylethanolamine in the basecoat system from migrating into the overlying clearcoat layer and reacting with the dodecylbenzenesulfonic acid curing catalyst. The tiecoat layer therefore likely prevented the development of wrinkling in the clearcoat layer.

Example 16: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 7 was repeated, except that the tiecoating composition was applied over the dehydrated basecoat by drawdown bar with a 3 mil gap. After curing, the panel was visually observed to evaluate wrinkling properties. The half of the cured panel having the intermediate tiecoat between the basecoat system and the clearcoat was smooth and glossy with no observable wrinkling. The half of the cured panel without the intermediate tiecoat between the basecoat system and the clearcoat exhibited visible wrinkling.

While not intending to be bound by any theory, it is believed that the tiecoat layer provided a polymerized and crosslinked barrier that prevented residual dimethylethanolamine in the basecoat system from migrating into the overlying clearcoat layer and reacting with the dodecylbenzenesulfonic acid curing catalyst. The tiecoat layer therefore likely prevented the development of wrinkling in the clearcoat layer. Additionally, it is believed that the extended lengths of the Ambient Flash and the Dehydration Bake were insufficiently long to allow enough of the dimethylethanolamine in the basecoat system to evaporate out and avoid causing wrinkling in the clearcoat applied over the half without the intermediate tiecoat.

Example 17: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 8 was repeated, except that the tiecoating composition was applied over the dehydrated basecoat by drawdown bar with a 3 mil gap. After curing, the panel was visually observed to evaluate wrinkling properties. The entire panel (both the halves, with and without the intermediate tiecoat between the basecoat system and the clearcoat) was smooth and glossy with no observable wrinkling. While not intending to be bound by any theory, it is believed that the extended length of the Dehydration Bake was sufficiently long to allow a substantial portion of the dimethylethanolamine in the basecoat system to evaporate out and, as a result, there was little to no residual dimethylethanolamine left in the basecoat system to migrate into the overlying clearcoat layer and react with the dodecylbenzenesulfonic acid curing catalyst and cause wrinkling in the clearcoat layer.

Example 18: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 9 was repeated, except that the tiecoating composition was applied over the dehydrated basecoat by drawdown bar with a 3 mil gap. After curing, the panel was visually observed to evaluate wrinkling properties. The half of the cured panel having the intermediate tiecoat between the basecoat system and the clearcoat was smooth and glossy with no observable wrinkling. The half of the cured panel without the intermediate tiecoat between the basecoat system and the clearcoat exhibited visible wrinkling.

While not intending to be bound by any theory, it is believed that the tiecoat layer provided a polymerized and crosslinked barrier that prevented residual dimethylethanolamine in the basecoat system from migrating into the overlying clearcoat layer and reacting with the dodecylbenzenesulfonic acid curing catalyst. The tiecoat layer therefore likely prevented the development of wrinkling in the clearcoat layer. Additionally, it is believed that the extended length of the Ambient Flash was insufficiently long to allow enough of the dimethylethanolamine in the basecoat system to evaporate out and avoid causing wrinkling in the clearcoat applied over the half without the intermediate tiecoat.

Example 19: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 10 was repeated, except that the tiecoating composition was applied over the dehydrated basecoat by drawdown bar with a 3 mil gap. After curing, the panel was visually observed to evaluate wrinkling properties. The half of the cured panel having the intermediate tiecoat between the basecoat system and the clearcoat was smooth and glossy with no observable wrinkling. The half of the cured panel without the intermediate tiecoat between the basecoat system and the clearcoat exhibited visible wrinkling.

While not intending to be bound by any theory, it is believed that the tiecoat layer provided a polymerized and crosslinked barrier that prevented residual dimethylethanolamine in the basecoat system from migrating into the overlying clearcoat layer and reacting with the dodecylbenzenesulfonic acid curing catalyst. The tiecoat layer therefore likely prevented the development of wrinkling in the clearcoat layer. Additionally, it is believed that the extended lengths of the Ambient Flash and the Dehydration Bake were insufficiently long to allow enough of the dimethylethanolamine in the basecoat system to evaporate out and avoid causing wrinkling in the clearcoat applied over the half without the intermediate tiecoat.

Example 20: A Multi-Layer Coating System Comprising an Acid-Catalyzed Curable Clearcoat Over an Amine-Containing Curable Basecoat with an Intermediate 1,1-Di-Activated Vinyl Compound-Containing Tiecoat Example 11 was repeated, except that the tiecoating composition was applied over the dehydrated basecoat by drawdown bar with a 3 mil gap. After curing, the panel was visually observed to evaluate wrinkling properties. The entire panel (both the halves, with and without the intermediate tiecoat between the basecoat system and the clearcoat) was smooth and glossy with no observable wrinkling. While not intending to be bound by any theory, it is believed that the extended length of the Dehydration Bake was sufficiently long to allow a substantial portion of the dimethylethanolamine in the basecoat system to evaporate out and, as a result, there was little to no residual dimethylethanolamine left in the basecoat system to migrate into the overlying clearcoat layer and react with the dodecylbenzenesulfonic acid curing catalyst and cause wrinkling in the clearcoat layer.

Example 21: A Multi-Layer Coating System Comprising an Acid-Catalyzed Curable Clearcoat Over an Amine-Containing Curable Basecoat (Comparative)

A multi-layer coating was prepared by applying a basecoat topcoat system over steel panels. A water-based basecoat system comprising two coating layers was applied over a 4-inch by 12-inch cold-rolled steel substrate panel pre-coated with ED-6465 electrocoat (electrocoat available from PPG Industries, Inc., and substrate panels available in pre-coated form from ACT Test Panels LLC). The coating layers were applied under controlled conditions of 20-22° C. temperature and 60-65% relative humidity. The first coating layer of the basecoat system (Basecoating Composition A, described above in Example 1A) was sprayed over the electrocoat on the substrate panel using a Binks model 95AR Conventional Air Spray Gun with a 1.8 millimeter nozzle at 60 psi. The first coating layer of the basecoat system was allowed to dry for 5 minutes under ambient conditions.

The second coating layer of the basecoat system (Basecoating Composition B, described above in Example 1B) was sprayed over the dried first coating layer of the basecoat system using a Binks model 95AR Conventional Air Spray Gun with a 1.8 millimeter nozzle at 60 psi. The second coating layer was sprayed in two consecutive coats without any intermediate drying between spray applications. The two coating layers of the basecoat system where then allowed to dry for 5 minutes under ambient conditions and thereafter dehydrated for 7 minutes at 70° C. The film thickness of the basecoat system (all coating layers) after dehydrating was approximately 40 micrometers.

A clearcoat layer (Clearcoating Composition, described above in Example 2) was sprayed over the entire dehydrated panel using a Binks model 95AR Conventional Air Spray Gun with a 1.8 millimeter nozzle at 60 psi. The clearcoat layer was sprayed in two consecutive coats with a one-minute interval between spray applications. The panel with the applied clearcoat layer was flashed under ambient conditions for 10 minutes ("Flash Time") and then baked for 30 minutes at 140° C. to cure the multi-layer coating system.

After curing, the panel was visually observed to evaluate wrinkling properties. The coating system exhibited severe wrinkling over the entire coated surface of the panel and poor edge-coverage as the clearcoat layer receded from the edge of the panel. While not intending to be bound by any theory, it is believed that the residual dimethylethanolamine in the basecoat system migrated into the overlying clearcoat layer during the baking procedure and reacted with the dodecylbenzenesulfonic acid curing catalyst in the clearcoat layer. The tiecoat layer therefore likely prevented the development of wrinkling in the clearcoat layer.

Example 22: A Multi-Layer Coating System Comprising an Acid-Catalyzed Curable Clearcoat Over an Amine-Containing Curable Basecoat (Comparative)

Example 21 was repeated, except that the Flash Time was 30 minutes instead of 10 minutes. The coating system exhibited severe wrinkling over the entire coated surface of the panel and poor edge-coverage as the clearcoat layer receded from the edge of the panel. While not intending to be bound by any theory, it is believed that the extended Flash Time was insufficiently long to allow enough of the dimethylethanolamine in the basecoat system to evaporate out and avoid causing wrinkling in the overlying clearcoat.

Example 23: A Multi-Layer Coating System Comprising an Acid-Catalyzed Curable Clearcoat Containing 1,1-Di-Activated Vinyl Compound Applied Over an Amine-Containing Curable Basecoat Example 21 was repeated, except that a mixture of diethyl methylene malonate and a transesterification adduct of diethyl methylene malonate and 1,6-hexanediol, as described in U.S. Publication No. 2014/0329980, was added to the Clearcoating Composition in an amount of 5% by total weight of the Clearcoating Composition before application of the clearcoat layer. The coating system exhibited substantially reduced wrinkling compared to the severe wrinkling observed in Example 21 (see Table 4, below, summarizing the results of Examples 21-30. While not intending to be bound by any theory, it is believed that the diethyl methylene malonate and/or the transesterification adduct of diethyl methylene malonate and 1,6-hexanediol in the applied clearcoat layer functioned as an amine scavenger that reacted with residual amine from the underlying basecoat system and reduced the amount of amine that reacted with the dodecylbenzenesulfonic acid curing catalyst in the clearcoat layer, thereby decreasing wrinkling in the cured clearcoat layer.

TABLE 4

| Example | Amine-Scavenger * | Flash Time (minutes) | Wrinkle Rating ‡ |
|---|---|---|---|
| 21 | 0 | 10 | 5 |
| 22 | 0 | 30 | 5 |
| 23 | 5 | 10 | 3 |
| 24 | 5 | 30 | 3 |
| 25 | 10 | 10 | 2 |
| 26 | 10 | 30 | 2 |
| 27 | 5 | 10 | 2 |
| 28 | 5 | 30 | 2 |

TABLE 4-continued

| Example | Amine-Scavenger * | Flash Time (minutes) | Wrinkle Rating ‡ |
|---|---|---|---|
| 29 | 10 | 10 | 2 |
| 30 | 10 | 30 | 2 |

* Percentage by total weight of mixture of diethyl methylene malonate and transesterification adduct of diethyl methylene malonate and 1,6-hexanediol (Examples 23-26) or mixture of diethyl methylene malonate and transesterification adduct of diethyl methylene malonate and 1,5-pentanediol (Examples 27-30) in the Clearcoating Composition used to form the applied clearcoat layers.
‡ 1: No observable wrinkling.
2: Minimal wrinkling localized to just the edges of the test panel.
3: Minimal wrinkling at isolated locations on test panel.
4: Wrinkling over portions of the coated surface of the test panel.
5: Severe wrinkling over the entire coated surface of the test panel.

Example 24: A Multi-Layer Coating System Comprising an Acid-Catalyzed Curable Clearcoat Containing 1,1-Di-Activated Vinyl Compound Applied Over an Amine-Containing Curable Basecoat Example 22 was repeated, except that a mixture of diethyl methylene malonate and a transesterification adduct of diethyl methylene malonate and 1,6-hexanediol, as described in U.S. Publication No. 2014/0329980, was added to the Clearcoating Composition in an amount of 5% by total weight of the Clearcoating Composition before application of the clearcoat layer. The coating system exhibited substantially reduced wrinkling compared to the severe wrinkling observed in Example 22 (see Table 4, above). While not intending to be bound by any theory, it is believed that the diethyl methylene malonate and/or the transesterification adduct of diethyl methylene malonate and 1,6-hexanediol in the applied clearcoat layer functioned as an amine scavenger that reacted with residual amine from the underlying basecoat system and reduced the amount of amine that reacted with the dodecylbenzenesulfonic acid curing catalyst in the clearcoat layer, thereby decreasing wrinkling in the cured clearcoat layer.

Example 25: A Multi-Layer Coating System Comprising an Acid-Catalyzed Curable Clearcoat Containing 1,1-Di-Activated Vinyl Compound Applied Over an Amine-Containing Curable Basecoat Example 21 was repeated, except that a mixture of diethyl methylene malonate and a transesterification adduct of diethyl methylene malonate and 1,6-hexanediol, as described in U.S. Publication No. 2014/0329980, was added to the Clearcoating Composition in an amount of 10% by total weight of the Clearcoating Composition before application of the clearcoat layer. The coating system exhibited substantially reduced wrinkling compared to the severe wrinkling observed in Example 21 (see Table 4, above). While not intending to be bound by any theory, it is believed that the diethyl methylene malonate and/or the transesterification adduct of diethyl methylene malonate and 1,6-hexanediol in the applied clearcoat layer functioned as an amine scavenger that reacted with residual amine from the underlying basecoat system and reduced the amount of amine that reacted with the dodecylbenzenesulfonic acid curing catalyst in the clearcoat layer, thereby decreasing wrinkling in the cured clearcoat layer.

Example 26: A Multi-Layer Coating System Comprising an Acid-Catalyzed Curable Clearcoat Containing 1,1-Di-Activated Vinyl Compound Applied Over an Amine-Containing Curable Basecoat Example 22 was repeated, except that a mixture of diethyl methylene malonate and a transesterification adduct of diethyl methylene malonate and 1,6-hexanediol, as described in U.S. Publication No. 2014/0329980, was added to the Clearcoating Composition in an amount of 10% by total weight of the Clearcoating Composition before application of the clearcoat layer. The coating system exhibited substantially reduced wrinkling compared to the severe wrinkling observed in Example 22 (see Table 4, above). While not intending to be bound by any theory, it is believed that the diethyl methylene malonate and/or the transesterification adduct of diethyl methylene malonate and 1,6-hexanediol in the applied clearcoat layer functioned as an amine scavenger that reacted with residual amine from the underlying basecoat system and reduced the amount of amine that reacted with the dodecylbenzenesulfonic acid curing catalyst in the clearcoat layer, thereby decreasing wrinkling in the cured clearcoat layer.

Example 27: A Multi-Laver Coating System Comprising an Acid-Catalyzed Curable Clearcoat Containing 1,1-Di-Activated Vinyl Compound Applied Over an Amine-Containing Curable Basecoat Example 21 was repeated, except that a mixture of diethyl methylene malonate and a transesterification adduct of diethyl methylene malonate and 1,5-pentanediol, as described in U.S. Publication No. 2014/0329980, was added to the Clearcoating Composition in an amount of 5% by total weight of the Clearcoating Composition before application of the clearcoat layer. The coating system exhibited substantially reduced wrinkling compared to the severe wrinkling observed in Example 21 (see Table 4, above). While not intending to be bound by any theory, it is believed that the diethyl methylene malonate and/or the transesterification adduct of diethyl methylene malonate and 1,5-pentanediol in the applied clearcoat layer functioned as an amine scavenger that reacted with residual amine from the underlying basecoat system and reduced the amount of amine that reacted with the dodecylbenzenesulfonic acid curing catalyst in the clearcoat layer, thereby decreasing wrinkling in the cured clearcoat layer.

Example 28: A Multi-Layer Coating System Comprising an Acid-Catalyzed Curable Clearcoat Containing 1,1-Di-Activated Vinyl Compound Applied Over an Amine-Containing Curable Basecoat Example 22 was repeated, except that a mixture of diethyl methylene malonate and a transesterification adduct of diethyl methylene malonate and 1,5-pentanediol, as described in U.S. Publication No. 2014/0329980, was added to the Clearcoating Composition in an amount of 5% by total weight of the Clearcoating Composition before application of the clearcoat layer. The coating system exhibited substantially reduced wrinkling compared to the severe wrinkling observed in Example 22 (see Table 4, above). While not intending to be bound by any theory, it is believed that the diethyl methylene malonate and/or the transesterification adduct of diethyl methylene malonate and 1,5-pentanediol in the applied clearcoat layer functioned as an amine scavenger that reacted with residual amine from the underlying basecoat system and reduced the amount of amine that reacted with the dodecylbenzenesulfonic acid curing catalyst in the clearcoat layer, thereby decreasing wrinkling in the cured clearcoat layer.

Example 29: A Multi-Laver Coating System Comprising an Acid-Catalyzed Curable Clearcoat Containing 1,1-Di-Activated Vinyl Compound Applied Over an Amine-Containing Curable Basecoat Example 21 was repeated, except that a mixture of diethyl methylene malonate and a transesterification adduct of diethyl methylene malonate and 1,5-pentanediol, as described in U.S. Publication No. 2014/0329980, was added to the Clearcoating Composition in an amount of 10% by total weight of the Clearcoating Composition before application of the clearcoat layer. The coating system exhibited substantially reduced wrinkling compared to the severe wrinkling observed in Example 21 (see Table 4, above). While not intending to be bound by any theory, it is believed that the diethyl methylene malonate and/or the transesterification adduct of diethyl methylene malonate and 1,5-pentanediol in the applied clearcoat layer functioned as an amine scavenger that reacted with residual amine from the underlying basecoat system and reduced the amount of amine that reacted with the dodecylbenzenesulfonic acid curing catalyst in the clearcoat layer, thereby decreasing wrinkling in the cured clearcoat layer.

Example 30: A Multi-Layer Coating System Comprising an Acid-Catalyzed Curable Clearcoat Containing 1,1-Di-Activated Vinyl Compound Applied Over an Amine-Containing Curable Basecoat Example 22 was repeated, except that a mixture of diethyl methylene malonate and a transesterification adduct of diethyl methylene malonate and 1,5-pentanediol, as described in U.S. Publication No. 2014/0329980, was added to the Clearcoating Composition in an amount of 10% by total weight of the Clearcoating Composition before application of the clearcoat layer. The coating system exhibited substantially reduced wrinkling compared to the severe wrinkling observed in Example 22 (see Table 4, above). While not intending to be bound by any theory, it is believed that the diethyl methylene malonate and/or the transesterification adduct of diethyl methylene malonate and 1,5-pentanediol in the applied clearcoat layer functioned as an amine scavenger that reacted with residual amine from the underlying basecoat system and reduced the amount of amine that reacted with the dodecylbenzenesulfonic acid curing catalyst in the clearcoat layer, thereby decreasing wrinkling in the cured clearcoat layer.

ASPECTS OF THE INVENTION

Aspects of the invention include, but are not limited to, the following numbered clauses.
1. An coating comprising:
   a polymeric resin;
   an acid curing catalyst; and
   a 1,1-di-activated vinyl compound, or a multifunctional form thereof, or a combination thereof.

2. The coating of clause 1, wherein the polymeric resin comprises a carbamate-functional resin, an epoxy-functional resin, an amino-functional resin, a siloxane resin, a melamine resin, a phenolic resin, or a combination of any thereof.

3. The coating of clause 1 or clause 2, wherein the polymeric resin comprises polymer molecules comprising any combination of carbamate groups, epoxy groups, siloxane groups, amino groups, melamine groups, or phenol-formaldehyde groups.

4. The coating of any one of clauses 1-3, wherein the polymeric resin comprises a carbamate-functional resin.

5. The coating of any one of clauses 1-4, wherein the carbamate-functional resin comprises a carbamate-functional acrylic resin.

6. The coating of any one of clauses 1-5, wherein the carbamate-functional resin comprises a carbamate-functional and hydroxy-functional acrylic resin.

7. The coating of any one of clauses 1-6, further comprising a melamine-formaldehyde resin.

8. The coating of any one of clauses 1-7, wherein the acid curing catalyst comprises a strong acid.

9. The coating of any one of clauses 1-8, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof.

10. The coating of any one of clauses 1-9, wherein the 1,1-di-activated vinyl compound comprises:
    a dialkyl methylene malonate;
    a diaryl methylene malonate:
    a multifunctional form of a dialkyl methylene malonate; or
    a multifunctional form of a diaryl methylene malonate; or
    a combination of any thereof.

11. The coating of any one of clauses 1-10, wherein the 1,1-di-activated vinyl compound comprises:
    diethyl methylene malonate; and
    a multifunctional form of diethyl methylene malonate comprising a transesterification adduct of diethyl methylene malonate and at least one polyol.

12. The coating of clause 11, wherein the transesterification adduct of diethyl methylene malonate and at least one polyol comprises a transesterification adduct of diethyl methylene malonate and a diol.

13. The coating of clause 12, wherein the diol comprises an alkane diol.

14. The coating of clause 13, wherein the alkane diol comprises 1,5-pentane diol and/or 1,6-hexanediol.

15. A multi-layer coating comprising:
    a first coating layer applied over at least a portion of a substrate; and
    a second coating layer applied over at least a portion of the first coating layer:
    wherein the second coating layer is formed from a coating composition comprising:
        a carbamate-functional resin;
        an acid curing catalyst; and
        a 1,1-di-activated vinyl compound, or a multifunctional form thereof, or a combination thereof.

16. The multi-layer coating of clause 15, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof.

17. The multi-layer coating of clause 15 or clause 16, wherein the 1,1-di-activated vinyl compound comprises:
    a dialkyl methylene malonate;
    a diaryl methylene malonate;
    a multifunctional form of a dialkyl methylene malonate; or
    a multifunctional form of a diaryl methylene malonate; or
    a combination of any thereof.

18. The multi-layer coating of any one of clauses 15-17, wherein the 1,1-di-activated vinyl compound comprises:
    diethyl methylene malonate; and
    a multifunctional form of diethyl methylene malonate comprising a transesterification adduct of diethyl methylene malonate and at least one polyol.

19. The multi-layer coating of clause 18, wherein the transesterification adduct of diethyl methylene malonate and at least one polyol comprises a transesterification adduct of diethyl methylene malonate and a diol.

20. The multi-layer coating of clause 19, wherein the diol comprises an alkane diol.

21. The multi-layer coating of clause 20, wherein the alkane diol comprises 1,5-pentane diol and/or 1,6-hexanediol.

22. The multi-layer coating of any one of clauses 15-21, wherein the carbamate-functional resin comprises a carbamate-functional acrylic resin.

23. The multi-layer coating of any one of clauses 15-22, wherein the carbamate-functional resin comprises a carbamate-functional and hydroxy-functional acrylic resin.

24. The multi-layer coating of any one of clauses 15-23, wherein the coating composition forming the second coating layer further comprises a melamine-formaldehyde resin.

25. The multi-layer coating of any one of clauses 15-24, wherein the first coating layer is formed from a coating composition comprising an amine compound.

26. The multi-layer coating of clause 25, wherein the amine compound comprises 2-15 percent by solids weight of the coating composition forming the first coating layer.

27. The multi-layer coating of clause 25 or clause 26, wherein the amine compound has a standard boiling point temperature less than 165° C.

28. The multi-layer coating of any one of clauses 25-27, wherein the amine compound has a pKa greater than 9.5, measured in water at 25° C., and 1 atmosphere pressure.

29. The multi-layer coating of any one of clauses 25-28, wherein the amine compound comprises a tertiary amine compound.

30. The multi-layer coating of clause 29, wherein the tertiary amine compound comprises 2-(dimethylamino)ethanol.

31. The multi-layer coating of any one of clauses 15-30, wherein the coating composition forming the first coating layer further comprises a polyester resin, an acrylic resin, and a melamine-formaldehyde resin.

32. A multi-layer coating comprising:
    a first coating layer applied over at least a portion of a substrate;
    a second coating layer applied over at least a portion of the first coating layer, wherein the second coating layer is formed from a coating composition comprising 1,1-di-activated vinyl compound, or a multifunctional form thereof, or a combination thereof; and
    a third coating layer applied over at least a portion of the second coating layer, wherein the third coating layer is formed from a coating composition comprising a carbamate-functional resin and an acid curing catalyst.

33. The multi-layer coating of clause 32, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof.

34. The multi-layer coating of clause 32 or clause 33, wherein the 1,1-di-activated vinyl compound comprises:
a dialkyl methylene malonate;
a diaryl methylene malonate;
a multifunctional form of a dialkyl methylene malonate; or
a multifunctional form of a diaryl methylene malonate; or
a combination of any thereof.

35. The multi-layer coating of any one of clauses 32-34, wherein the 1,1-di-activated vinyl compound comprises:
diethyl methylene malonate; and
a multifunctional form of diethyl methylene malonate comprising a transesterification adduct of diethyl methylene malonate and at least one polyol.

36. The multi-layer coating of clause 35, wherein the transesterification adduct of diethyl methylene malonate and at least one polyol comprises a transesterification adduct of diethyl methylene malonate and a diol.

37. The multi-layer coating of clause 36, wherein the diol comprises an alkane diol.

38. The multi-layer coating of clause 37, wherein the alkane diol comprises 1,5-pentane diol and/or 1,6-hexanediol.

39. The multi-layer coating of any one of clauses 32-38, wherein the second coating layer comprises a polymerization reaction product of the 1,1-di-activated vinyl compound, or a multifunctional form thereof, or a combination thereof.

40. The multi-layer coating of any one of clauses 32-39, wherein the carbamate-functional resin comprises a carbamate-functional acrylic resin.

41. The multi-layer coating of any one of clauses 32-40, wherein the carbamate-functional resin comprises a carbamate-functional and hydroxy-functional acrylic resin.

42. The multi-layer coating of any one of clauses 32-41, wherein the coating composition forming the third coating layer further comprises a melamine-formaldehyde resin.

43. The multi-layer coating of any one of clauses 3242, wherein the first coating layer is formed from a coating composition comprising an amine compound.

44. The multi-layer coating of clause 43, wherein the amine compound comprises 2-15 percent by solids weight of the coating composition forming the first coating layer.

45. The multi-layer coating of clause 43 or clause 44, wherein the amine compound has a standard boiling point temperature less than 165° C.

46. The multi-layer coating of any one of clauses 43-45, wherein the amine compound has a pKa greater than 9.5, measured in water at 25° C., and 1 atmosphere pressure.

47. The multi-layer coating of any one of clauses 4346, wherein the amine compound comprises a tertiary amine compound.

48. The multi-layer coating of clause 47, wherein the tertiary amine compound comprises 2-(dimethylamino)ethanol.

49. The multi-layer coating of any one of clauses 32-48, wherein the coating composition forming the first coating layer further comprises a polyester resin, an acrylic resin, and a melamine-formaldehyde resin.

50. Use of a 1,1-di-activated vinyl compound, or a multifunctional form thereof, or a combination thereof to prevent wrinkling in a coating comprising a polymeric resin and an acid curing catalyst, applied over an underlying coating comprising a base.

51. The use of clause 50, wherein the 1,1-di-activated vinyl compound, or the multifunctional form thereof, or the combination thereof is a 1,1-di-activated vinyl compound, or a multifunctional form thereof, or a combination thereof as described in any one of clauses 9-14 and/or the polymeric resin is a polymeric resin as described in any one of clauses 2-7 and/or the acid curing catalysts is an acid curing catalysts as described in clause 8 and/or the underlying coating is an underlying coating as described in any one of clauses 25-31.

52. The use of clause 50 or clause 51, wherein the 1,1-diactivated vinyl compound, or the multifunctional form thereof, or the combination thereof is included in the coating comprising the polymeric resin and the acid curing catalyst or is applied as a separate coating layer between the coating comprising the polymeric resin and the acid curing catalyst and the underlying coating comprising the base.

53. A process for coating a substrate, comprising:
applying a coating layer over at least a portion of the substrate, the coating layer comprising:
a polymeric resin;
an acid curing catalyst; and
a 1,1-di-activated vinyl compound, or a multifunctional form thereof, or a combination thereof, and curing the applied coating layer.

54. A process for coating a substrate, comprising:
applying a first coating layer over at least a portion of the substrate;
applying a second coating layer over at least a portion of the first coating layer, the second coating layer comprising:
a polymeric resin;
an acid curing catalyst; and
a 1,1-di-activated vinyl compound, or a multifunctional form thereof, or a combination thereof;
curing the applied first coating layer and the applied second coating layer.

55. An article coated with the coating composition of clauses 1-14.

56. The article of clause 55, wherein the article comprises of vehicle components, components of free-standing structures, automotive substrates, industrial substrates, aircraft components, watercraft components, packaging substrates, wood flooring, furniture, apparel, electronics, glass, transparencies, sports equipment, and/or appliances.

57. An article coated with the multi-layer coating composition of clauses 15-49.

58. The article of clause 57, wherein the article is selected from the group consisting of vehicle components, components of free-standing structures, automotive substrates, industrial substrates, aircraft components, watercraft components, packaging substrates, wood flooring, furniture, apparel, electronics, glass, transparencies, sports equipment, and appliances.

Various features and characteristics are described in this specification to provide an understanding of the composition, structure, production, function, and/or operation of the invention, which includes the disclosed compositions, coatings, and processes. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements, including the requirements under 35 U.S.C. § 112(a) and Article 123(2) EPC.

Any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements, including the requirements under 35 U.S.C. § 112(a) and Article 123(2) EPC. Also, unless expressly specified or otherwise required by context, all numerical parameters described in this specification (such as those expressing values, ranges, amounts, percentages, and the like) may be read as if prefaced by the word "about," even if the word "about" does not expressly appear before a number. Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameter.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a composition, coating, or process that "comprises," "has," "includes," or "contains" one or more features and/or characteristics possesses those one or more features and/or characteristics, but is not limited to possessing only those one or more features and/or characteristics. Likewise, an element of a composition, coating, or process that "comprises," "has," "includes," or "contains" one or more features and/or characteristics possesses those one or more features and/or characteristics, but is not limited to possessing only those one or more features and/or characteristics, and may possess additional features and/or characteristics.

The grammatical articles "a," "an," and "the," as used in this specification, including the claims, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

Any patent, publication, or other document identified in this specification is incorporated by reference into this specification in its entirety unless otherwise indicated, but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with written description, sufficiency of description, and added matter requirements, including the requirements under 35 U.S.C. § 112(a) and Article 123(2) EPC.

What is claimed is:

1. A multi-layer coating for a substrate, the multi-layer coating comprising:
   a first coating layer configured to be applied over at least a portion of the substrate, wherein the first coating layer is formed from a coating composition comprising 1,1-di-activated vinyl compound, or a multifunctional form thereof, or a combination thereof, wherein the 1,1-di-activated vinyl compound comprises a methylene dicarbonyl compound, a dihalo vinyl compound, or a dihaloalkyl disubstituted vinyl compound, or a multifunctional form of any thereof, or a combination of any thereof; and
   a second coating layer applied over at least a portion of the first coating layer, wherein the second coating layer is formed from a coating composition comprising a polymeric resin and an acid curing catalyst.

2. The multi-layer coating of claim 1, wherein the 1,1-di-activated vinyl compound comprises:
   a dialkyl methylene malonate;
   a diaryl methylene malonate;
   a multifunctional form of a dialkyl methylene malonate; or
   a multifunctional form of a diaryl methylene malonate; or
   a combination of any thereof.

3. The multi-layer coating of claim 1, wherein the 1,1-di-activated vinyl compound comprises:
   diethyl methylene malonate; and
   a multifunctional form of diethyl methylene malonate comprising a transesterification adduct of diethyl methylene malonate and at least one polyol.

4. The multi-layer coating of claim 3, wherein the transesterification adduct of diethyl methylene malonate and at least one polyol comprises a transesterification adduct of diethyl methylene malonate and a diol.

5. The multi-layer coating of claim 4, wherein the diol comprises an alkane diol.

6. The multi-layer coating of claim 5, wherein the alkane diol comprises 1,5-pentane diol and/or 1,6-hexanediol.

7. The multi-layer coating of claim 1, wherein the first coating layer comprises a polymerization reaction product of the 1,1-di-activated vinyl compound, or a multifunctional form thereof, or a combination thereof.

8. The multi-layer coating of claim 1, wherein the polymeric resin comprises a carbamate-functional resin, an epoxy-functional resin, an amino-functional resin, a siloxane resin, a melamine resin, a phenolic resin, or a combination thereof.

9. The multi-layer coating of claim 1, wherein the polymeric resin comprises a carbamate-functional resin.

10. The multi-layer coating of claim 1, wherein the polymeric resin comprises a carbamate-functional acrylic resin.

11. The multi-layer coating of claim 1, wherein the polymeric resin comprises a carbamate-functional resin and a hydroxy-functional acrylic resin.

12. The multi-layer coating of claim 1, wherein the second coating layer further comprises a melamine-formaldehyde resin.

13. The multi-layer coating of claim 1, further comprising a third coating layer, wherein the first coating layer is applied over at least a portion of the third coating layer.

14. The multi-layer coating of claim 13, wherein the third coating layer is formed from a coating composition comprising an amine compound.

15. The multi-layer coating of claim 14, wherein the coating composition forming the third coating layer further comprises a polyester resin, an acrylic resin, and a melamine-formaldehyde resin.

16. An article coated with the multi-layer coating of claim 1, wherein the article comprises the substrate.

17. The article of claim 16, wherein the article comprises vehicle components, components of free-standing structures, automotive substrates, industrial substrates, aircraft components, watercraft components, packaging substrates, aircraft components, watercraft components, packaging substrates, wood flooring, furniture, apparel, electronics, glass, transparencies, sports equipment, and/or appliances.

18. A process for coating the substrate with the multi-layer coating of claim 1, the process comprising:
applying the first coating layer over at least a portion of the substrate;
applying the second coating layer over at least a portion of the first coating layer; and
curing the applied first coating layer and the applied second coating layer.

19. A process for coating the substrate with the multi-layer coating of claim 13, the process comprising:
applying the third coating layer over at least a portion of the substrate;
applying the first coating layer over at least a portion of the third coating layer;
applying the second coating layer over at least a portion of the first coating layer; and
curing the applied first coating layer, the applied second coating layer, and the applied third coating layer.

* * * * *